INVENTOR.
JOSERH ADRIEN M. LEDUC
BY John C. Quinlan
Marylin Klosty
ATTORNEYS

Sept. 19, 1967  J. A. M. LEDUC  3,342,717
ELECTROCHEMICAL CELL
Filed Aug. 2, 1963  13 Sheets-Sheet 5

INVENTOR.
JOSEPH ADRIEN M. LEDUC

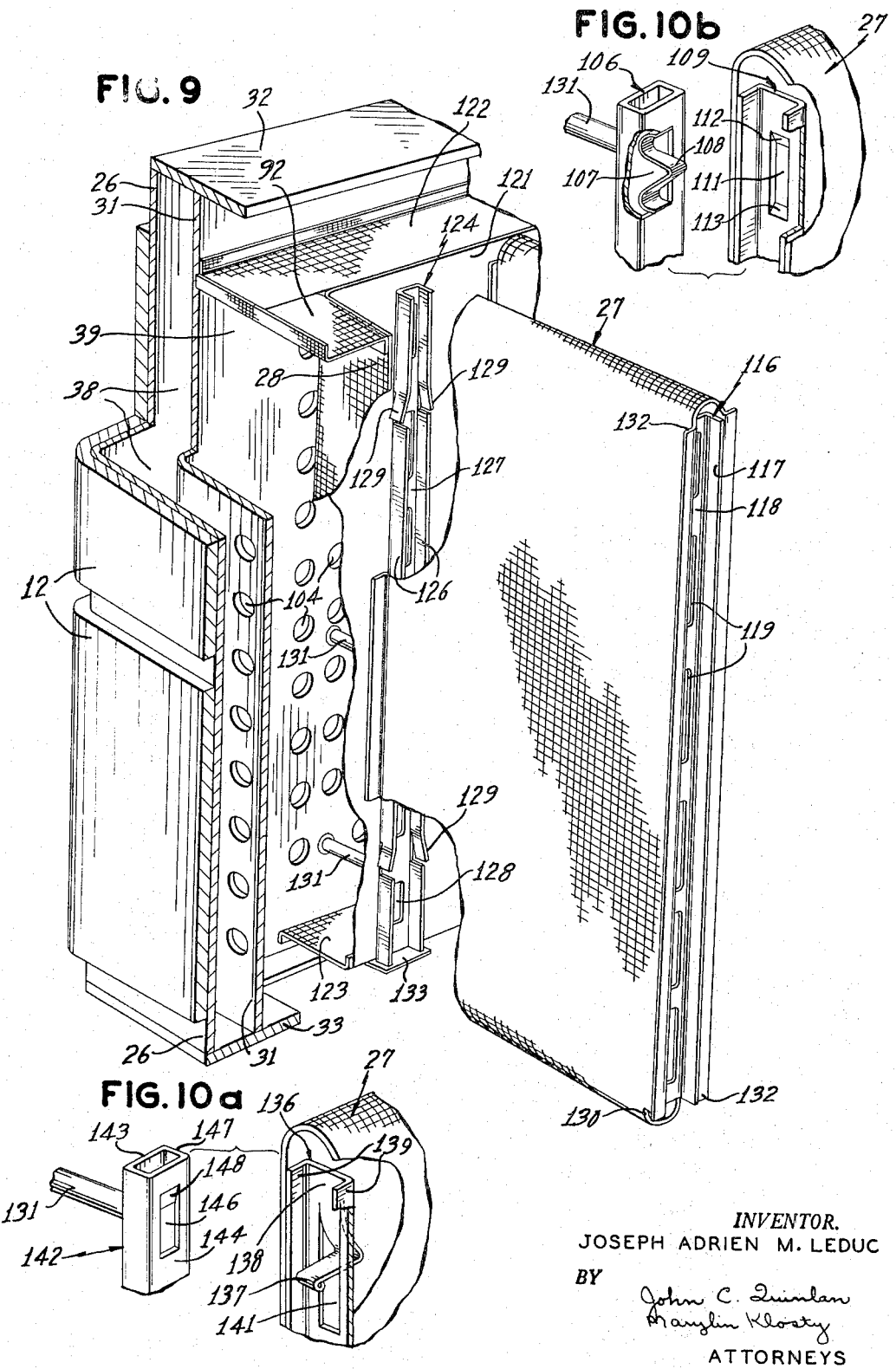

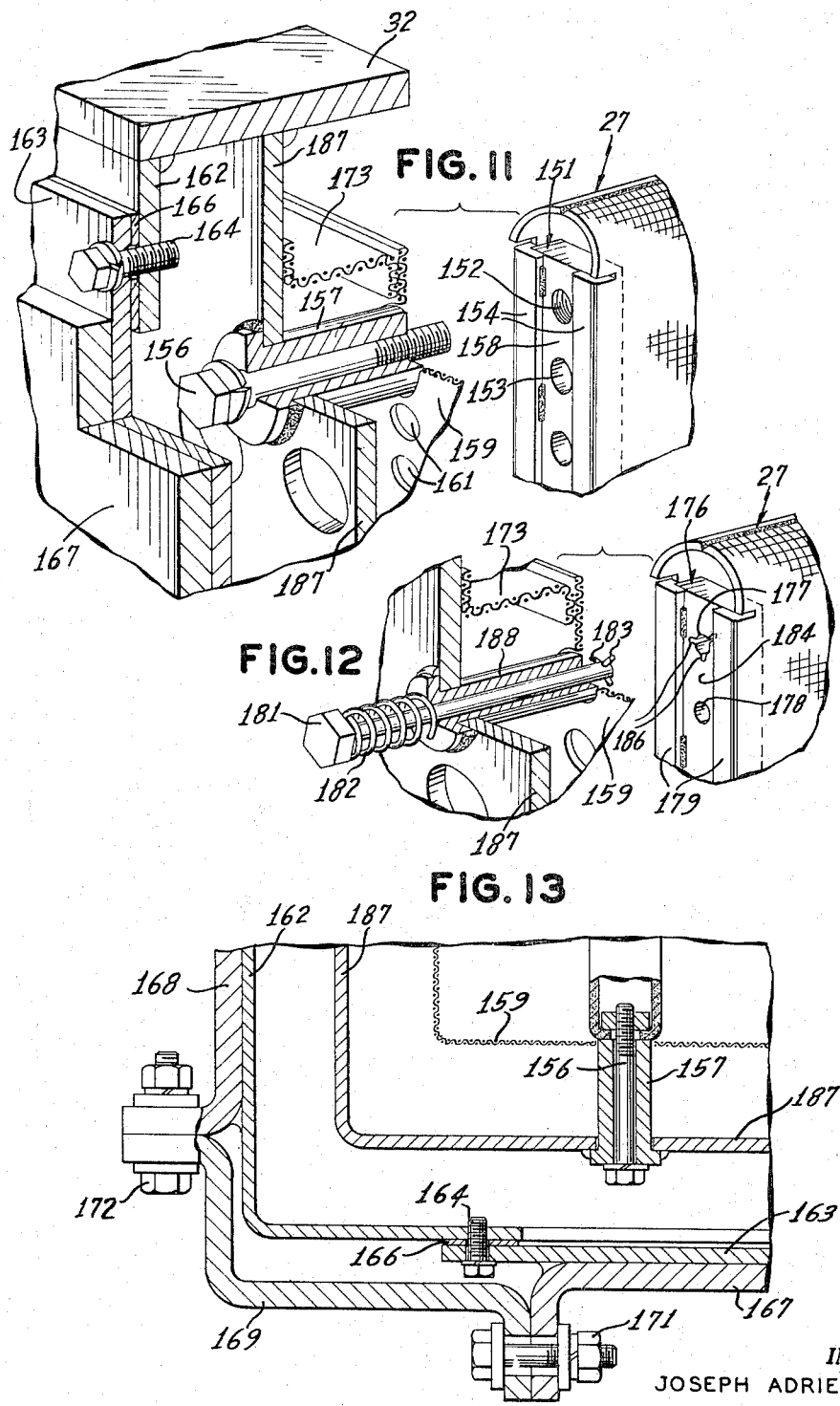

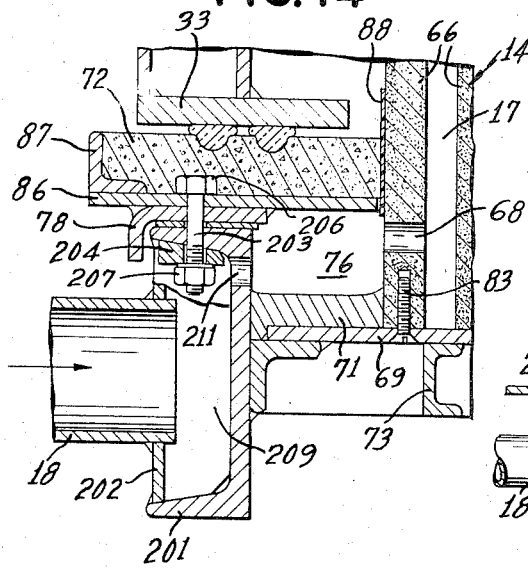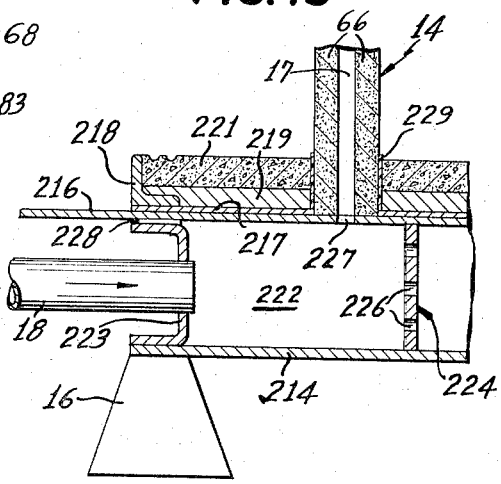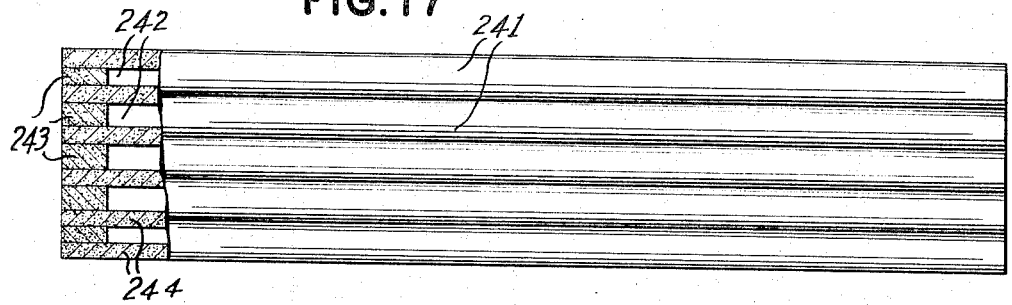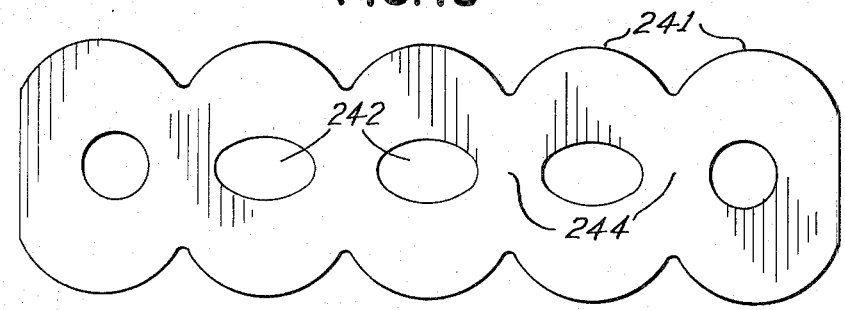

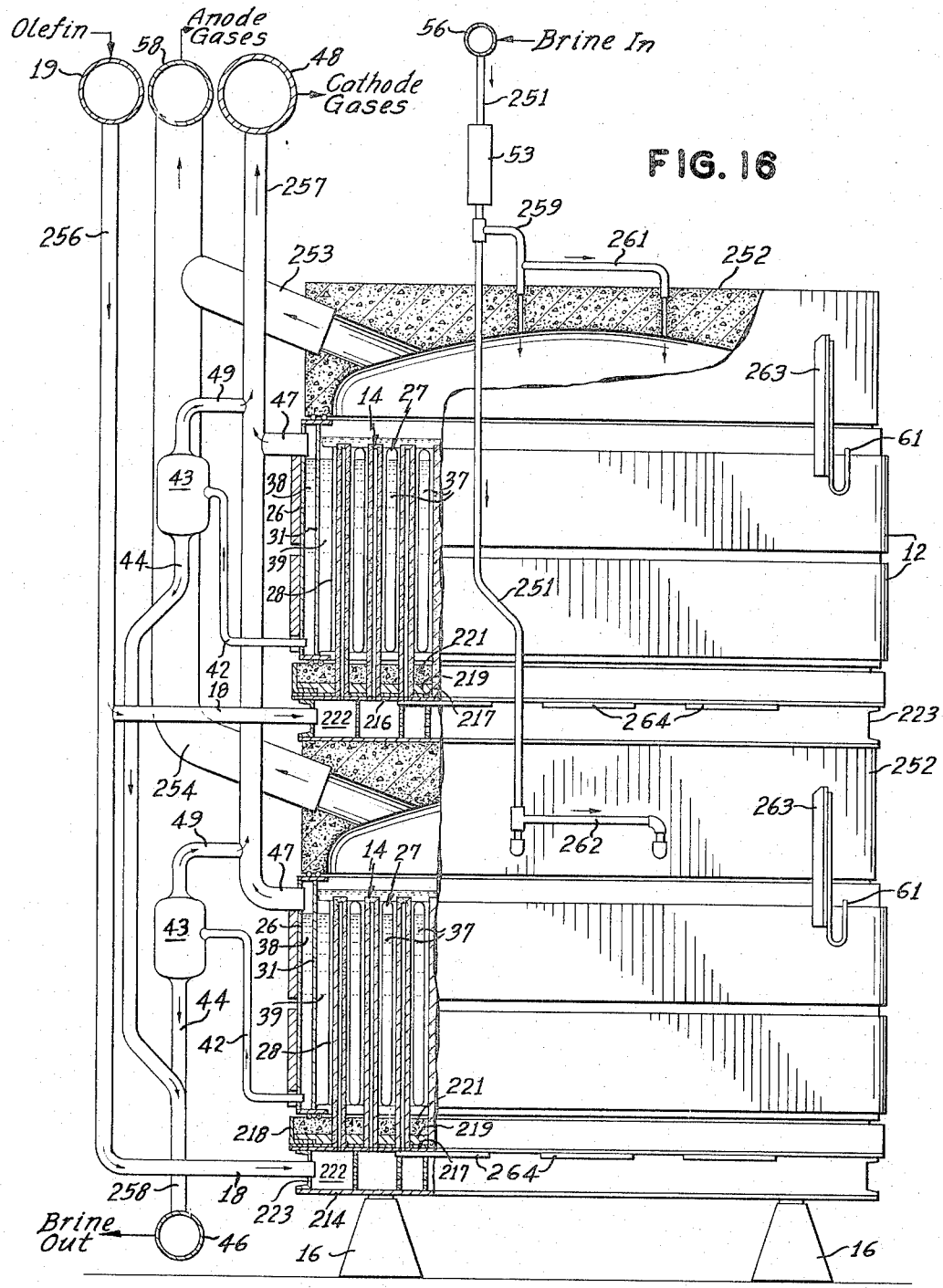

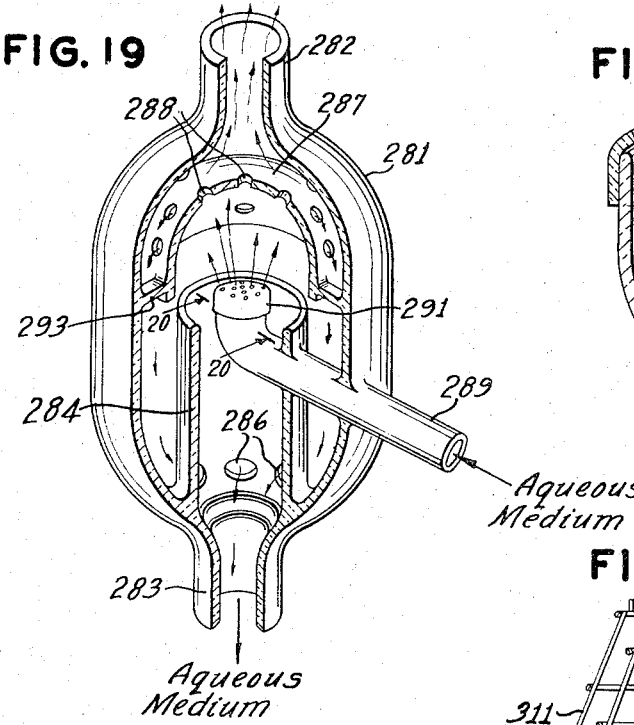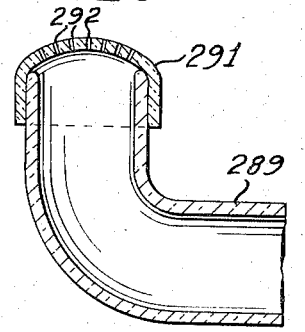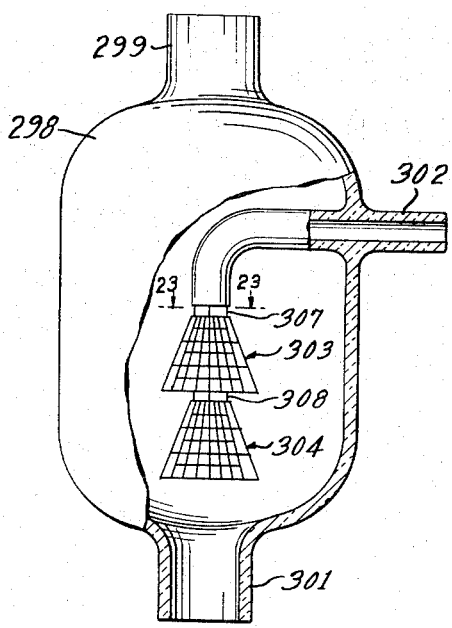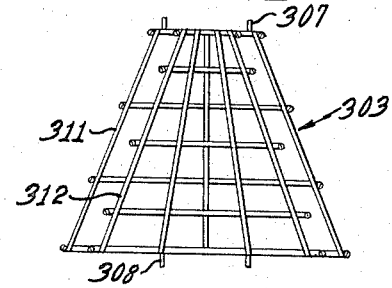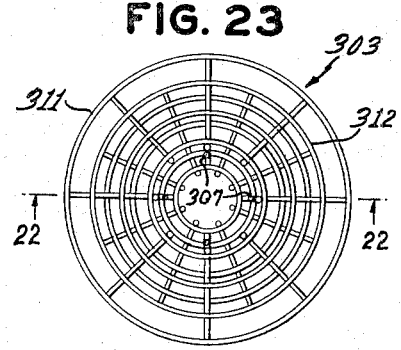
INVENTOR.
JOSEPH ADRIEN M. LEDUC
BY
ATTORNEYS

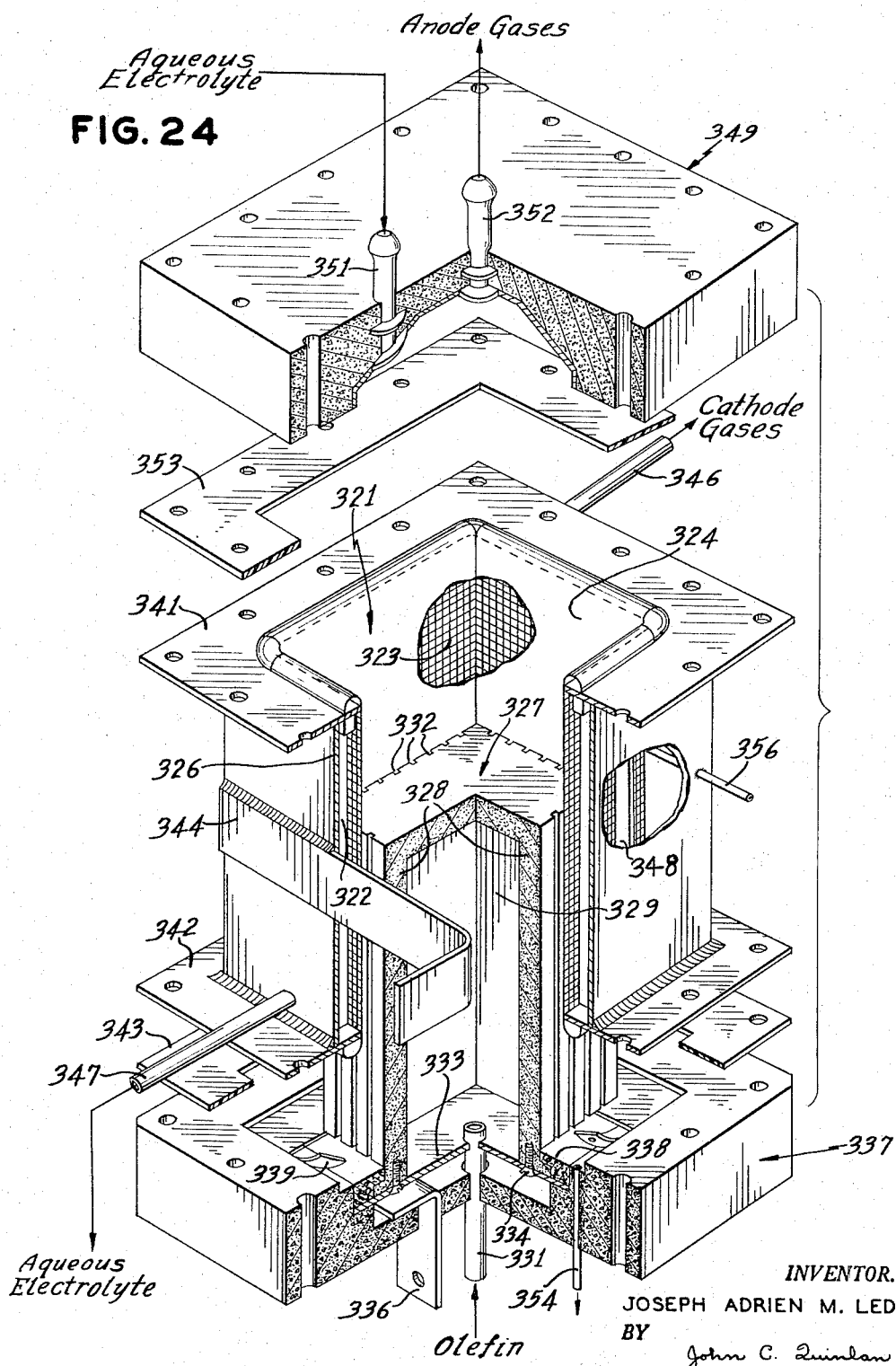

# 3,342,717
ELECTROCHEMICAL CELL
Joseph Adrien M. Leduc, Short Hills, N.J., assignor to Pullman Incorporated, a corporation of Delaware
Filed Aug. 2, 1963, Ser. No. 299,519
33 Claims. (Cl. 204—265)

This application is a continuation-in-part of my prior and copending application Ser. No. 224,991, filed Sept. 20, 1962, now U.S. Patent No. 3,288,692.

This invention relates to an electromechanical cell in which an organic product is produced. In one aspect the invention relates to apparatus especially suitable for the production of an olefin oxide electrochemically from an olefinic compound and water. In another aspect the invention relates to improvement in an electrolytic cell of the diaphragm type.

Olefin oxides constitute a valuable group of organic chemicals which are useful as such or as building blocks for other chemicals and industrial products. Ethylene oxide and propylene oxide, for example, are used to produce the corresponding glycols. Ethylene glycol is used widely in the automotive antifreeze industry. Propylene glycol is used widely as an edible solvent for flavors. The olefin oxides are also useful in the manufacture of cellulosic textiles and, in recent years, large quantities of propylene oxide have been consumed in the manufacture of polyurethanes and has now become attractive for the production of rubber. These oxides and others such as styrene oxide are also useful in the manufacture of resinous condensation products such as those obtained by condensation of the oxide with phenol. Other industrial outlets for such oxides include their use as fumigants and non-ionic detergents.

In accordance with my said application Serial No. 224,991, olefin oxide is produced by the process which comprises passing an electric current through an aqueous medium containing a metal halide as electrolyte while introducing a feed comprising an olefinic compound such as ethylene or propylene, for example, to the vicinity of the anode to produce olefin oxide within the cell, and recovering the olefin oxide as a product of the process. The overall principal reaction which takes place by my novel process is shown by the following equation wherein the grouping

is used to illustrate the olefinic reactant which is fed to the proximity of the anode of the electrolytic cell:

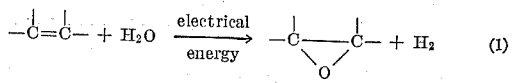 (1)

As shown by this general equation the only raw materials which are consumed in the formation of the olefin oxide are the olefin, water, and electrical energy, the metal halide electrolyte being regenerated in situ, i.e., within the electrolytic cell. In addition to the fact that the olefin oxide is produced in good yields and selectivity, hydrogen is also generated in good yield and is separated from the olefin oxide and recovered in substantially pure form as a valuable second product of the process.

It is an object of this invention to provide particular apparatus especially suitable for the electrochemical production of olefin oxide.

Another object is to provide an electrochemical cell for the production of olefin oxide which is provided with means for feeding gaseous olefin reactant to the cell such that it is brought into the proximity of the anodic surface.

Another object is to provide an electrolytic cell in which olefin oxide is produced and which allows for the withdrawal of gaseous cathode effluent and gaseous anode effluent from the cell as separate effluent streams.

A further object is to provide a cell having the above features and which is further provided with means for effectuating separation of dissolved olefin oxide product or entrained vapors thereof from the aqueous electrolyte medium.

A further object is to provide an electrolytic cell of the diaphragm type in which the electrode having the diaphragm thereon is readily fastened in place and removed from the cell.

A further object is to provide means in association with an electrolytic cell in which a water soluble vaporizable product is produced, which means has the dual function of breaking the flow of aqueous electrolyte medium discharged from the cell and of causing further separation of dissolved product from the aqueous medium.

A still further object is to provide an improvement in an electrolytic cell of the diaphragm type and in which hydrogen is produced which improvement causes more rapid discharge of hydrogen from the cell such that accumulation of hydrogen therein is minimized.

A still further object is to provide a cell having the above advantages and which is readily assembled and disassembled.

A still further object is to provide an electrolytic cell capable of operating at an increased amperage per unit such as up to 100,000 amperes or more and which has a corresponding increased production capacity per unit.

Various other objects and advantages of this invention will become apparent to those skilled in the art from the accompanying description and disclosure.

In accordance with the teachings of this invention an electrochemical cell for the production of olefin oxide is provided which comprises in combination an inner chamber, referred to herein as the inner cell chamber, to which the aqueous electrolyte medium is fed and in which the electrode surfaces are disposed in spaced relationship, the electrode surfaces including at least one anode opposed by a formaminous cathodic surface having a fluid permeable diaphragm in association therewith; a base provided with means for supplying olefin reactant to the vicinity of the anode; an outer chamber in fluid communication with the inner chamber of the cell; and outlet means for withdrawing from the cell an effluent stream comprising olefin oxide product. The cell is usually provided with a cover and when the olefin reactant is normally gaseous or in the vapor state under the conditions of cell operation, the cover is provided with outlet means by which gaseous effluent comprising any unreacted olefins is withdrawn from the cell.

In its simplest form, the preferred embodiment of the electrolytic cell of this invention comprises in combination the following separable and integral units;

(a) An enclosed lower unit or base having at least one anode secured therein and extending upwardly therefrom, the anode being porous and having an inner chamber, means for furnishing electric current to the anode, and means for feeding olefin reactant to the anodic surface by upward flow into the inner chamber of the anode;

(b) A middle unit, mounted on the lower unit and formed of an electrically conductive material, comprising a cathode compartment and an adjacent anode compartment separated by a foraminous cathodic surface having a diaphragm thereon, the anode secured in the lower unit of the cell extending upwardly into the anode compartment, and a peripheral chamber comprising the cathode compartment and provided with means by which the aqueous electrolyte solution and cathode gases are withdrawn from the cell, and means by which electric current is supplied to the foraminous cathodic surface, and (c) An upper unit mounted on the middle section which comprises the cover or dome of the cell and is provided with means for feeding aqueous solution to the anode compartment and for allowing anode gases to pass from the cell.

In operation aqueous electrolyte solution comprising a metal halide is supplied to the inner cell chamber such that the direction of flow is downwardly between the opposing anodic surfaces which are porous and the cathodic surfaces which are foraminous with a diaphragm deposited thereon. The aqueous medium then passes through the diaphragm in association with the cathodic surface into the cathode compartment and is subsequently discharged from the cell. While maintaining this direction of flow of aqueous electrolyte medium, olefin reactant is supplied to the lower section of the cell such that it flows upwardly through the hollow chamber of the porous anodes and reacts at the olefin-anolyte interface. The term "anolyte" as used herein refers to the aqueous solution of electrolyte which is present in the vicinity of the anode, i.e., contained in the anode compartment, and which flows from the anode compartment in the direction of and through the diaphragm in association with the cathodes. The reaction which takes place in the anolyte results in the formation of the halohydrin derivative of the olefin. The overall reaction which occurs in the anolyte is illustrated by the following equation:

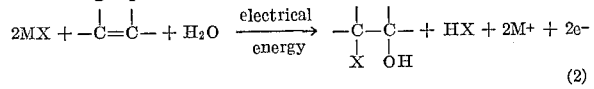

(2)

in which MX is used to typically illustrate one group of suitable metal halides, M being an alkali metal such as, for example, sodium, and X being any of the halogens, usually chlorine.

Another reaction which usually occurs in the anolyte is the direct addition of elemental halogen across the olefinic double bond resulting in the formation of the corresponding dihalo derivative of the olefin which is recoverable as another valuable product of the process in the anode gases and/or by treatment of the aqueous electrolyte after it is discharged from the cell.

As used herein the term "anode gases" defines the gaseous or vaporous effluent which is evolved from the anode compartment and, in effecting the process in the apparatus of this invention, the anode gases comprise unreacted olefin, water vapor and usually dihalo by-product. Although the reaction in the anolyte results in the formation of a halohydrin, the anode gases are free of molecular halogen.

While the halohydrin compound is being formed in the anolyte which is acidic, water is electrolyzed at the cathodic surface to form hydroxyl ion and molecular hydrogen, the catholyte therefore being alkaline. The diaphragm on the cathodic surface retards or prevents the hydroxyl ion from migrating into the anolyte, the diaphragm also confining the hydrogen gas within the cathode compartment and preventing it from combining with the anode gases evolved from the anode compartment. The anolyte, containing the halohydrin derivative of the olefin, flows through the diaphragm into the cathode compartment wherein it is dehydrohalogenated to form olefin oxide product. In addition, the hydrohalic acid (HX) formed in the anolyte in accordance with Equation 2 above reacts in the alkaline catholyte to regenerate additional halide ion, and thus restoring in situ the chemical reactants of the electrolyte feed. The reactions which occur in the catholyte are illustrated by the following equations:

$$2H_2O + 2e^- \rightarrow H_2 + 2OH^- \quad (3)$$

$$2M^+ + 2OH^- \rightarrow 2MOH \quad (4)$$

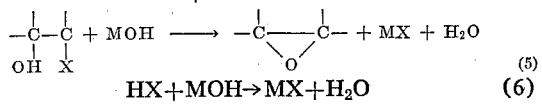

(5)

$$HX + MOH \rightarrow MX + H_2O \quad (6)$$

wherein M is an alkali metal, for example, and X is halogen. The hydrogen which is formed and any vapors of olefin oxide product comprise the cathode gases which, together with the catholyte, exit from the peripheral chamber of the middle section of the cell of this invention.

The term "catholyte" as used herein is intended to describe the aqueous electrolyte medium at, and in the vicinity of the cathodic surfaces, i.e., contained in the cathode compartment, and is that portion of the aqueous medium in which the reactions of Equations 3–6 occur. As used herein the term "cathode gases" defines the gaseous or vaporous effluent evolved from the cathode compartment, the apparatus of this invention being such that the cathode gases consist essentially of olefin oxide product when sufficiently volatile, hydrogen which is recoverable as another valuable product of the process, and water vapor.

For a better understanding and further description of the electrolytic cells of this invention reference is had to FIGURES 1–24 of the accompanying drawings.

FIGURES 9, 10a, 10b, 11 and 12 are three-dimensional views in longitudinal cross-section illustrating removable means by which the cathodes are fastened within the cathode unit.

FIGURE 13 is a top view in cross-section of a cathode unit having removable side panels with attached bus bars and in which the cathodes are fastened by the removable means illustrated by FIGURE 11.

FIGURES 14 and 15 are longitudinal cross-sectional illustrations of further embodiments of the anode unit of the cells of this invention.

FIGURE 16 is a longitudinal cross-sectional view of an arrangement of the cells of this invention which allows for operation at increased amperage per unit area.

FIGURE 17 is a side view, partially cut away, of an anode having a series of inner hollow chambers, FIGURE 18 being a top view in cross-section.

FIGURE 19 is a three-dimensional view partly in cross-section illustrating one embodiment of a liquid flow interruptor with initial upward flow of the liquid, FIGURE 20 being a cross-sectional view of the liquid distributing means taken along line 20—20 of FIGURE 19.

FIGURE 21 is a cross-sectional view of a liquid flow interruptor with downward flow of liquid, FIGURE 23 being a top view in elevation of one of the liquid distributing means taken along line 23—23 of FIGURE 21. FIGURE 22 is a cross-sectional view of one of the liquid distributing means taken along line 22—22 of FIGURE 23.

FIGURE 24 is a three-dimensional view, partially cut away, in cross-section illustrating the electrolytic cell of this invention provided with a grooved anodic surface.

For the purpose of convenience and clarity and to facilitate the description and inspection of the figures of the accompanying drawings, the same reference numerals are used to designate common component parts, chambers and compartments.

Figure 1:
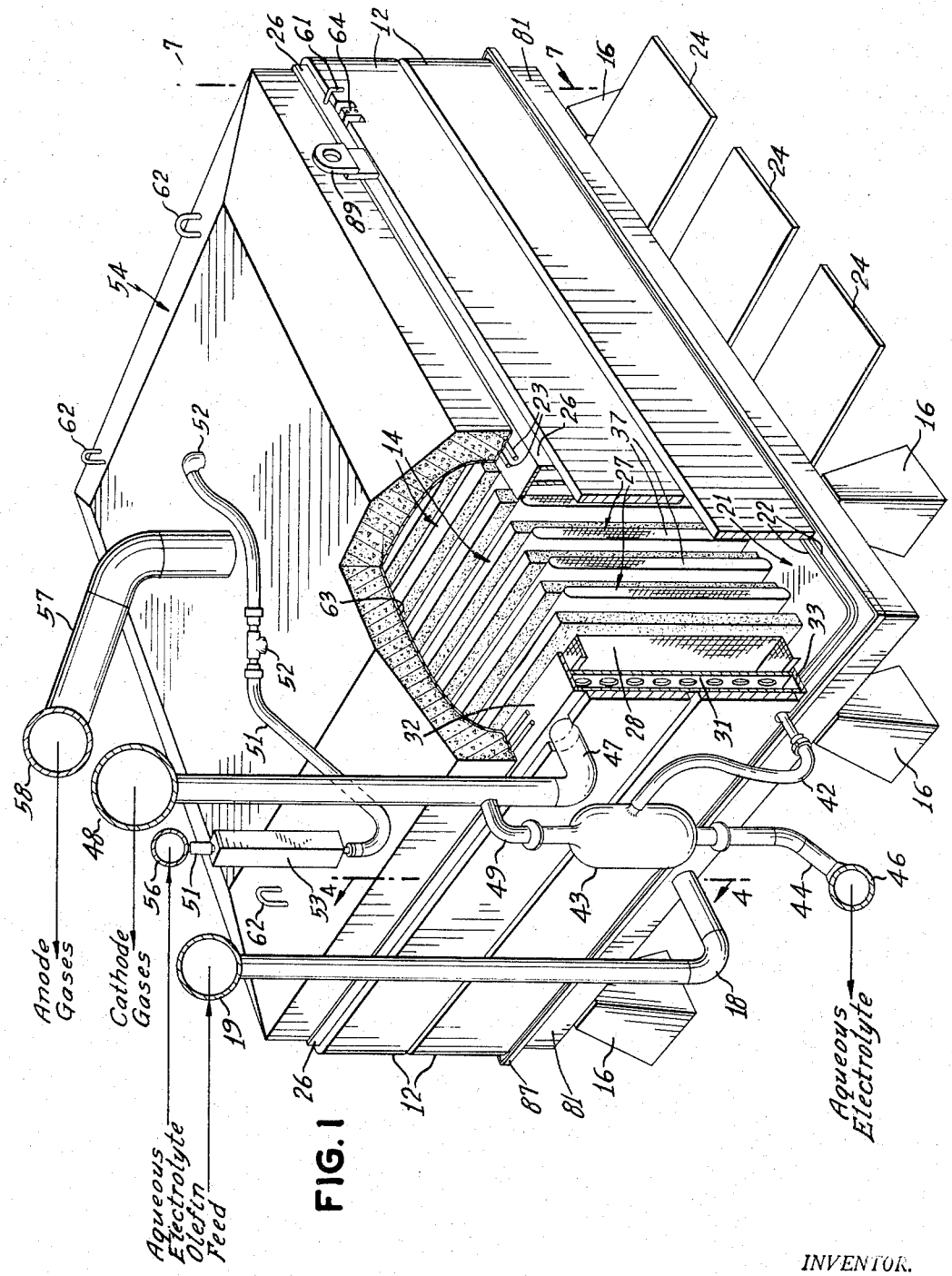
FIGURE 1 is a three-dimensional view of the cell of this invention as provided with a plurality of anodes and cathodes.

The assembled olefin oxide cell of this invention is a closed system and, as illustrated by the embodiment of FIGURE 1 to which reference is now had, comprises three main sections each of which is an integral unit, namely: (a) a lower section in which a plurality of anodes are secured, the lower section thus being referred to as the anode unit which is shown as an integral unit by FIGURE 3; (b) a middle section which comprises the cathodic surfaces, the middle section thus being referred to herein as the cathode unit and is shown as an integral unit by FIGURE 2; and (c) an upper section which comprises the dome of the cell and is shown in cross-section as an integral unit by FIGURE 6.

The assembled cell illustrated by FIGURE 1 comprises the inner cell chamber, in which a plurality of porous anodes 14 and hollow foraminous cathodes 27 are vertically disposed in alternating spaced relationship. The bottom wall or floor of the inner cell chamber is defined by surface 21 which is the top surface of the anode unit within which anodes 14 are secured, anodes 14 extending upwardly through surface 21 into the inner cell chamber. A source of direct current is supplied to the anodes by means of anode terminals 24 which are in electrical contact with current distributing means also fitted within the anode unit. Cathodes 27 within the inner cell chamber are tubular and, as shown, have substantially flat side surfaces and curved upper and lower surfaces although they may be of other geometric shapes and contour without departing from the scope of this invention. Cathodes 27 are open at either side end and enclose cathode compartments 37, and are above the level of the floor (surface 21) of the inner cell chamber. The peripheral wall of the inner cell chamber, including both the side and end walls, is foraminous. Cathodes 27 extend from the one side wall to the opposing side wall, the side walls being designated by numeral 29 as shown on FIGURE 2, and have openings therein opposing cathode compartments 37. The foraminous end walls of the inner cell chamber, i.e., those which are parallel to tubular cathodes 27, are designated by numeral 28 and also referred to herein as half-cathodes, and are above the level of the floor (surface 21) of the inner cell chamber.

The upper wall or top of the inner cell chamber is defined by lower surface 63 of dome 54 of the upper unit, dome 54 having port inlets 52 therethrough by means of which aqueous medium containing a metal halide electrolyte is fed to the inner cell chamber.

In addition to the inner cell chamber to which the aqueous medium is supplied from an external source, the olefin oxide cell of this invention also includes a peripheral chamber, referred to herein as the peripheral liquid-gas chamber. The outer wall of this chamber is cell casing 26 which has current distributing plate or bus bars 12 on the outer surface thereof. The inner wall of the peripheral chamber is defined by the outer surface of the foraminous peripheral wall of the inner cell chamber. In the cell illustrated by FIGURE 1, the peripheral liquid-gas chamber comprises two compartments, which are adjacent and are separated by perforated plate 31 as a common wall, the apertures in plate 31 allowing for free-flowing fluid communication therebetween. Also fitted to the cell and passing through cell casing 26 and perforated wall 31 is pipe 61 which is in open communication with the aqueous electrolyte medium within the cell. The outer end of pipe 61 is connected to a manometer (not shown) which is fitted to bracket 64 and by this external means the level of the liquid within the cell which is usually above the level of anodes 14, can be observed and thus controlled to the desired level.

The assembled cell illustrated by FIGURE 1 is also provided with a number of inlets and outlets by means of which olefin reactant and aqueous medium are fed to the cell and gaseous product and aqueous medium are discharged from the cell. The aqueous medium comprising a metal halide is supplied to the inner cell chamber by means of port inlets 52 within dome 54 to which the aqueous medium is supplied by inlet 51 having liquid controlling flow device 53 therein which is suitably of the overflow or float-valve type. The electrolyte flows downwardly by gravity between anodes 14 and the opposing foraminous cathodic surfaces, the electrolyte contained therebetween being called the anolyte. Olefin reactant is fed to the cell at a point below surface 21 such as by means of inlet 18 within the anode unit such that the olefin passes upwardly in contact with the anodic surfaces and reacts at the anolyte interface to form the halohydrin derivative of the olefin and usually dihalo by-product. The anode gases pass upwardly into the free space above the anolyte and exit from the cell by means of outlet 57 within dome 54. The aqueous medium containing the halohydrin compound formed in the anode compartment reacts, as it crosses the diaphragm in association with the cathodic surfaces, with the alkaline catholyte such as that contained in cathode compartments 37, to form olefin oxide product, hydrogen also being evolved at the cathodic surfaces. Thhe aqueous medium which usually contains dissolved olefin oxide and the cathode gases pass from the cell by means of outlet 42 and outlet 47, respectively. The discharged liquid medium passes through liquid flow interruptor 43 which breaks the continuous flow of electrolyte. The aqueous medium passes from flow interruptor 43 into downcomer 44, and additional cathode gases separated in flow interruptor 43 pass therefrom by means of header 49 and into outlet 47. Two embodiments of suitable liquid flow interruptors are illustrated by accompanying FIGURES 19 and 21.

It is to be undrestood that although FIGURE 1 shows one cell, the complete olefin oxide plant may consist of more than one cell. When the plant consists of a battery of cells the aqueous electroylte medium and olefin are fed to the individual inlets of each cell such as electrolyte inlet 51 and olefin inlet 18 from feeding manifolds 56 and 19, respectively. Similarly the liquid medium, anode gases and cathode gases flowing through outlets 44, 57 and 47, respectively, pass into the corresponding collecting common manifolds 46, 58 and 48.

The cell as illustrated by FIGURE 1, is elevated above floor level and is supported on support legs 16 which are fastened to the anode unit. These supports are composed of an insulating and electrically non-conductive material such as ceramic, cement, etc., or an electrically conductive material such as steel having an electrical insulator thereon.

The three main units are mounted one above the other, the cathode unit having hooks 89 thereon and the top unit having hooks 62 by means of which these units are lowered into place in assembling the cell. The units are held tightly together by their weight and in order to prevent leakage of anode and cathode gases and liquid medium from the cell, a tight seal is provided by various means and, as shown is provided by double O-ring seal 22 between lower flange 33 of cell casing 26 and the anode unit and double O-ring seal 23 between upper flange 32 and the top unit. The O-rings or other type of seal is composed of insulating and fluid impervious materials such as asbestos, asbestos or glass fiber (in the form of rope, cloth and sheet) impregnated or laminated with polytetrafluoroethylene plastic, phenol-formaldehyde resin, etc. When the cell is operated at substantially atmospheric pressure, no further securing means other than the weight of the cathode and top units is ordinarily required. When the cell is operated under pressure the units are usually held together by bolts, clamps, or other suitable means.

Figure 4:
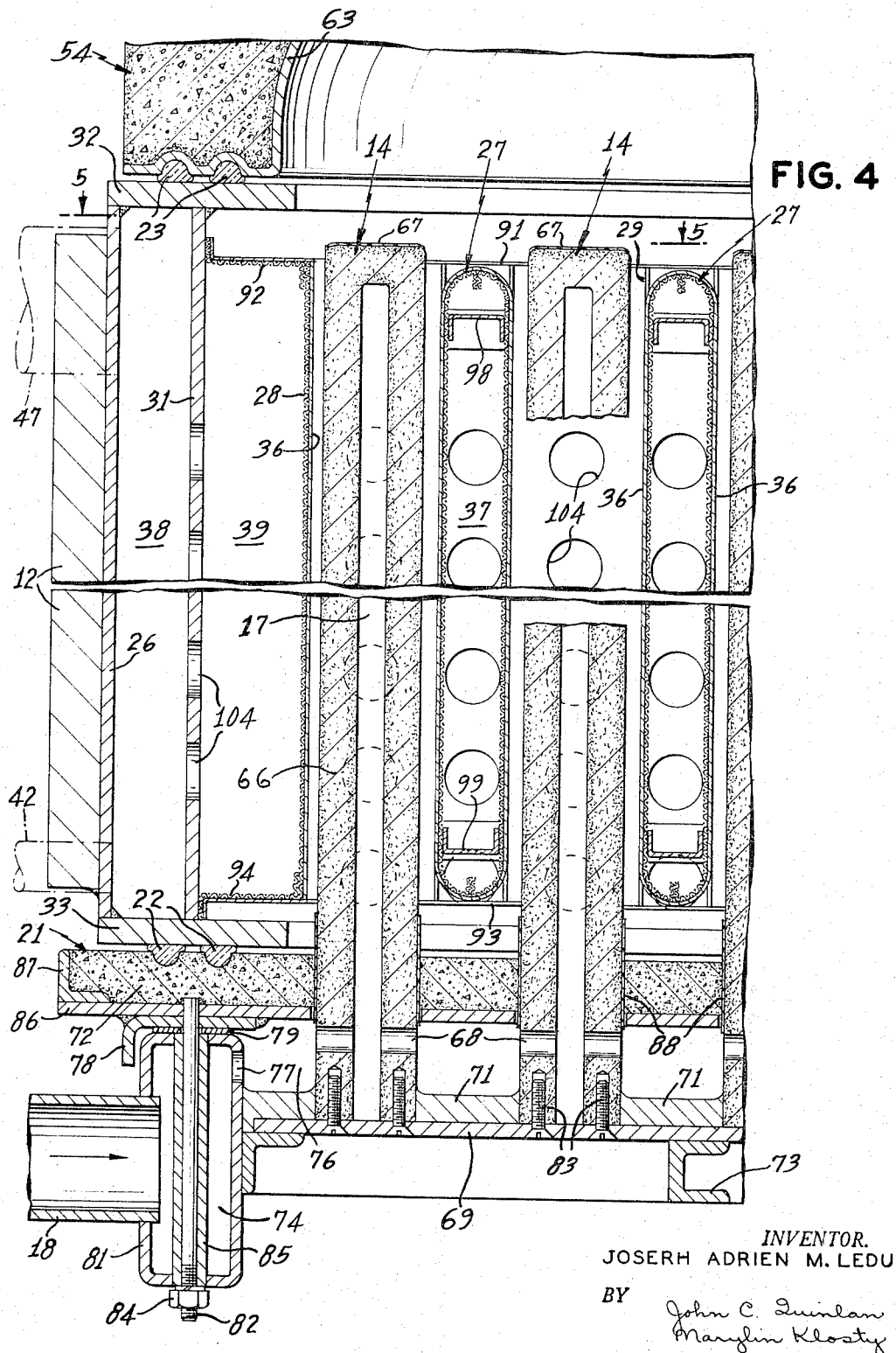
FIGURE 4 is a longitudinal cross-sectional view of the assembled cell of FIGURE 1 taken along line 4—4 of FIGURE 1.
Figure 7:
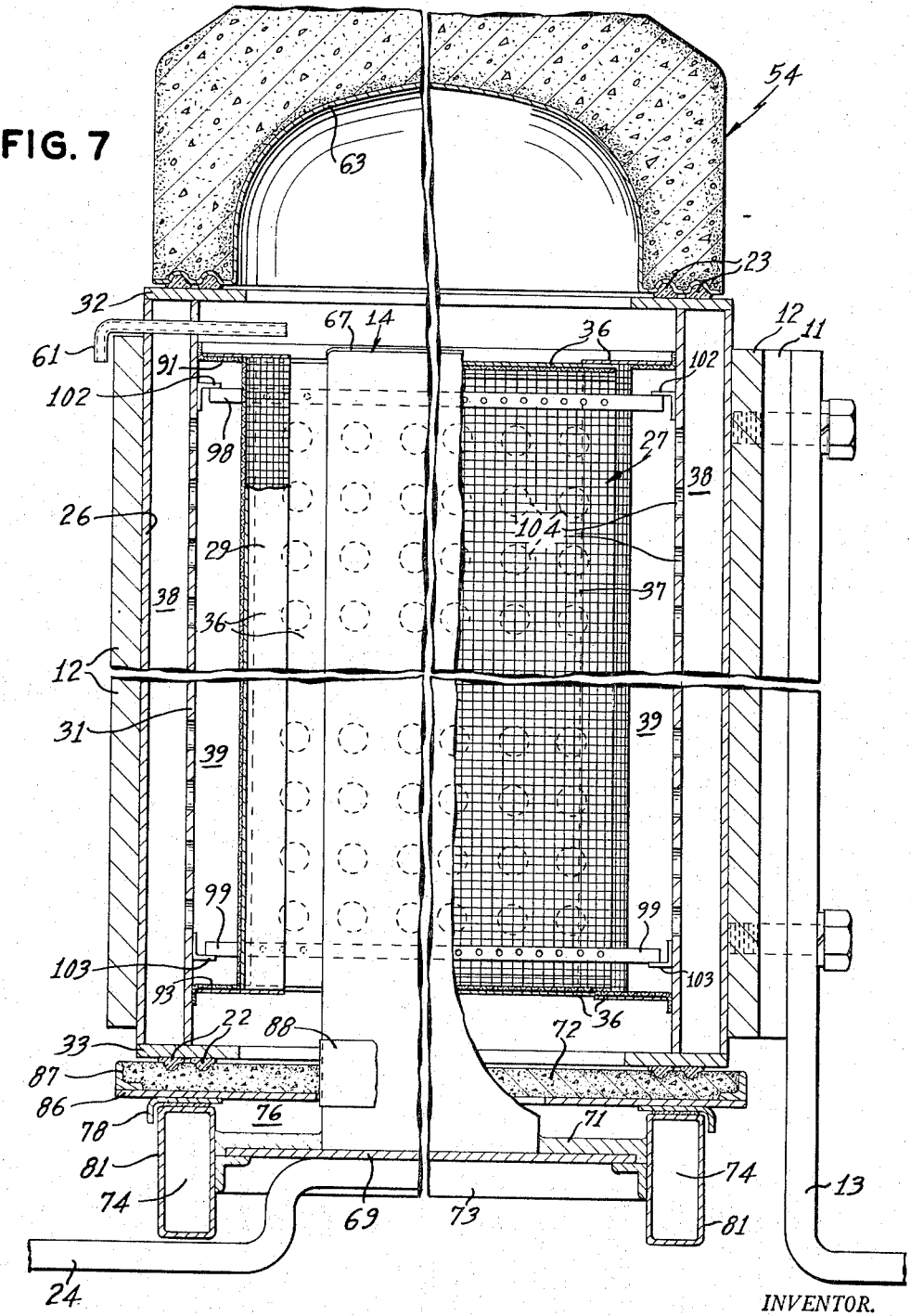
FIGURE 7 is a longitudinal cross-sectional view of the assembled cell of FIGURE 1 taken along line 7—7 of FIGURE 1.
Figure 8:
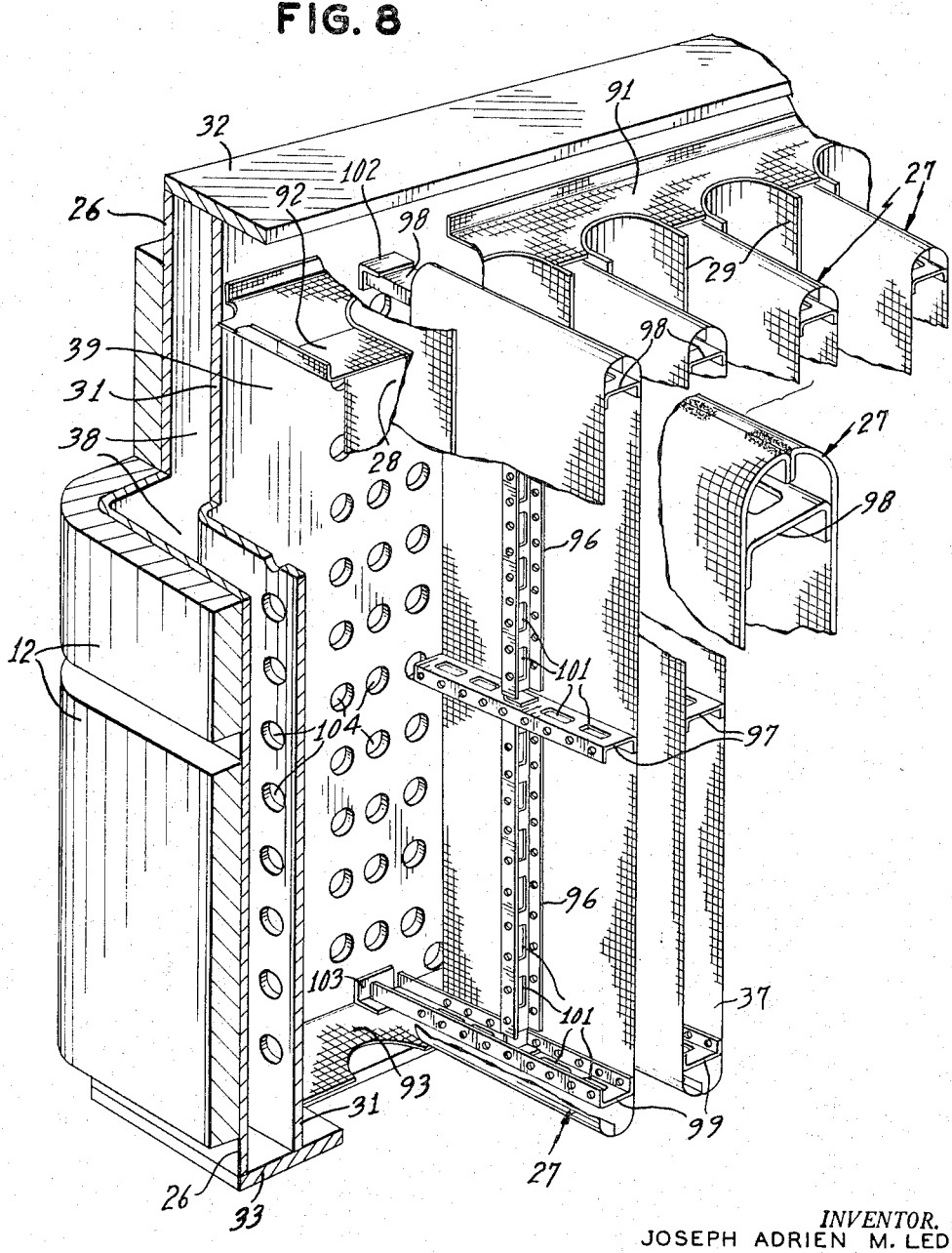
FIGURE 8 is a three-dimensional view in cross-section of the cathode unit and illustrates one means by which the cathodes are fastened therein.

The anode and cathode units as well as the top or dome unit are integral sections readily removable from each other and assembled. A three-dimensional view of the cathode unit of FIGURE 1 and of one embodiment of the anode unit are illustrated by accompanying FIG- URES 2 and 3, respectively, and cross-sectional views of the assembled cell are illustrated by FIGURES 4 and 7. As discussed in connection with FIGURE 1 and as illustrated in greater detail by FIGURE 2 to which reference is now had, the cathode unit has a continuous electrically conductive surface and comprises in combination:

(1) Outer casing 26 which is flanged around the top and bottom edges, the upper and lower flanges being designated by numerals 32 and 33 respectively, at least a portion of the outer surface of the casing being in contact with current distributing plates or bus bars 12;

(2) A peripheral chamber comprising an outer compartment and an inner compartment which are, respectively:

(a) Peripheral cathode gas-liquid separator compartment 38, the vertical walls of which are defined by (i) the inner surface of cell casing 26 and (ii) the outer surface of perforated plate 31, and is enclosed at the top and bottom by flanges 32 and 33, respectively, with which perforated plate 31 is in contact, peripheral compartment 38 also being provided with outlets 47 and 42 by means of which the cathode gases and aqueous medium, respectively, are discharged from the cell; and (b) Peripheral cathode compartment 39 the vertical walls of which are defined by (i) the inner surface of perforated plate 31 and (ii) the outer surface of the peripheral foraminous wall of the inner cell chamber comprising end walls or half-cathodes 28 and side walls 29, and is enclosed at the top by a continuous foraminous wall which extends between the peripheral foraminous wall and perforated plate 31 and, as shown, comprises foraminous sections 92 and 91 which extend outwardly from half-cathodes 28 and side walls 29, respectively, the peripheral cathode compartment 39 being enclosed at the bottom by a corresponding lower continuous foraminous wall, that section which extends outwardly from half-cathodes 28 being designated by numeral 94, the section extending outwardly from side walls 29 being best shown by FIGURE 8 and designated by numeral 93; and (3) Inner cathode compartments 37 the walls of which are defined by the inner surfaces of foraminous tubular cathodes 27 which extend across the inner cell chamber between the opposing foraminous side walls 29, cathode compartments 37 being in free-flowing fluid communication with peripheral cathode compartment 39 through slots in side walls 29, the slots opposing the open ends of tubular cathodes 27.

Figure 2:
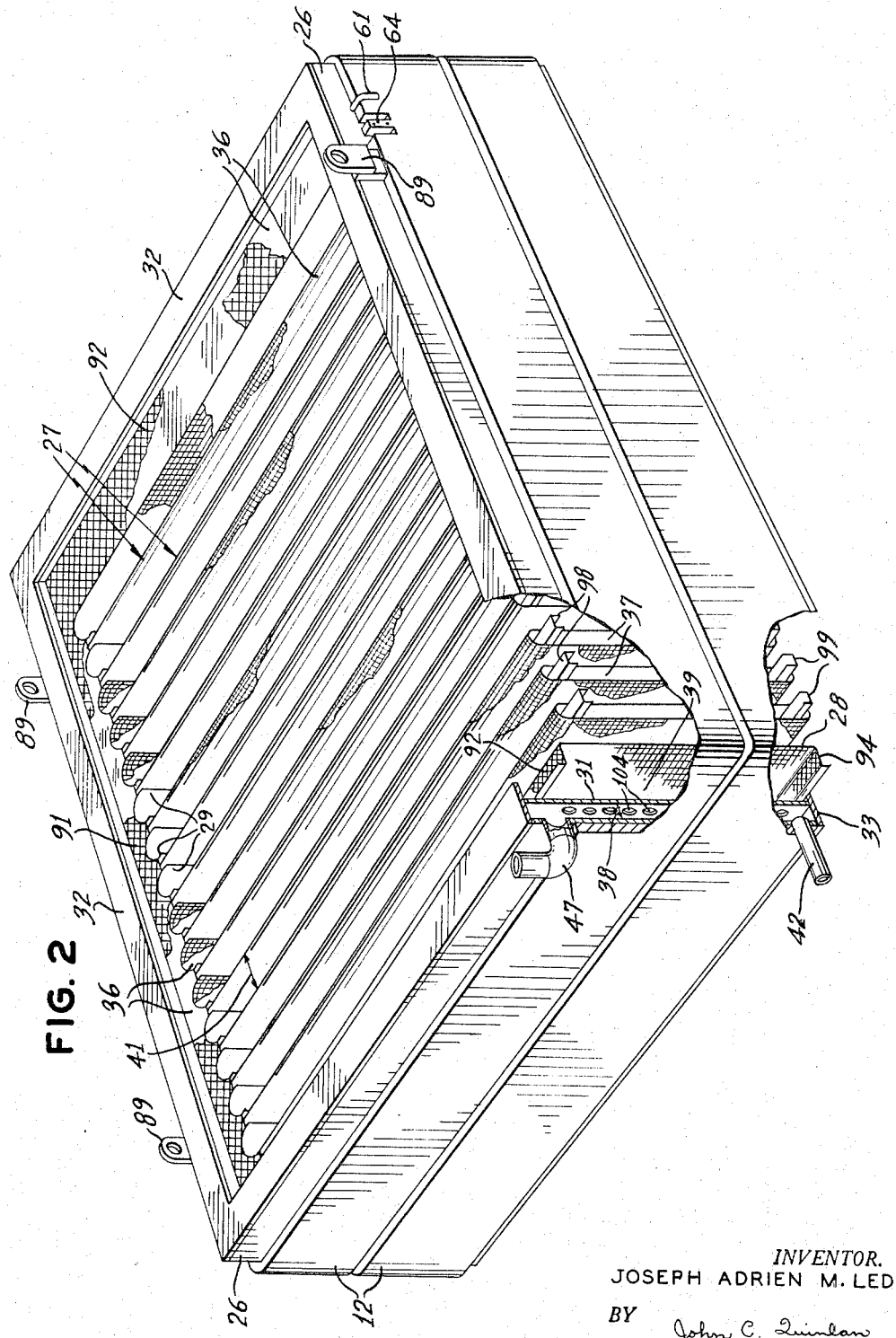
FIGURES 2 and 3 are three-dimensional views, partially cut away, of the cathode unit and anode unit, respectively, and illustrate these units as integral units.

As illustrated by FIGURE 2, the inner surfaces of vertical foraminous side walls 29 and of end walls 28, and the outer surfaces of tubular cathodes 27 are continuous and by that closure define a plurality of anode compartments 41 within which anodes 14 are positioned in the assembled cell of FIGURE 1. These foraminous surfaces, therefore, oppose the reactive anodic surfaces and comprise a continuous foraminous reactive cathodic surface at which hydrogen is evolved during the production of the olefin oxide product. In order to separate the entire cathode compartment which includes peripheral cathode compartment 39 and cathode compartments 37, from anode compartments 41 and yet allow the flow of aqueous medium from the anode compartments into the cathode compartment, the surfaces of the foraminous walls which physically define the anode compartments have liquid permeable diaphragm 36 thereon. In order to substantially confine the cathode gases within the peripheral cathode compartment 39, the upper and lower foraminous enclosing walls which extend outwardly from side walls 29 and end walls 28 also have diaphragm 36 in association therewith, i.e. on the top and lower surfaces, respectively.

The various walls of the cathode unit including cell casing 26, perforated plate 31, the foraminous vertical walls and the top and bottom foraminous enclosures of peripheral cathode compartment 39 are formed of an electrical conductor, usually a ferrous metal such as steel or stainless steel, etc., direct current being supplied to current distributing plates 12 and flowing throughout this unit. The reactive cathodic surfaces at which hydrogen and hydroxyl ion are formed are those surfaces which substantially oppose the anodic surfaces. The foraminous walls may be in the form of a metal screen (as shown) or expanded metal or other similar structure such as a perforated metal sheet, and are in association with a diaphragm formed of any suitable fluid permeable or porous material which is chemically inert to the aqueous electrolyte medium such as, for example, asbestos, polyethylene, poly-propylene, polytetrafluoroethylene or phenolformaldehyde polymers. The foraminous walls also may comprise a porous material such as porous polyethylene plastic having a conductor deposited within the pores thereof and having a barrier thereon to confine the cathode gases within the cathode compartment, such as a layer of electrically non-conductive porous polyethylene.

The foraminous surfaces of the cathode unit are fitted tightly together to form a continuous surface upon which the diaphragm or other barrier is overlaid and which defines anode compartments 41 into which the anodes secured within the anode unit are positioned in the assembled cell as shown by FIGURE 1.

The anode unit within which the anode surfaces are secured is also an integral unit and is provide with means for securing the anodic surfaces in place, means for distributing electric current to the anodic surfaces and means for feeding olefin reactant to the reactive anodic surfaces. One embodiment of the structure of the anode unit is illustrated by the three-dimensional view of FIGURE 3 to which reference is now had. As illustrated, a series of hollow anodes 14 are secured within the base, the number thereof corresponding to the number of anode compartments 41 defined by the foraminous surfaces of the cathode unit, the top surface 21 of the base forming the floor of the inner chamber of the assembled cell. Anode terminals 24 are connected to a source of direct current and are in electrical contact with a current distributing plate also fitted within the anode unit. The anodes are rigid and are formed of an electrically conductive material such as graphite as shown. It is to be understood, however that the anodes also may be composed of other electrically conductive materials without departing from the scope of this invention such as platinum, platinized titanium, platinized tantalum, magnetite, magnetites in which the lower valence iron is substituted with another metal such as cobalt, nickel, manganese, etc., or the anodes may be formed of a porous inert substrate such as polyethylene which is metallized and which has a metal such as platinum or platinum-titanium alloy on the exposed surface of the pores.

Side walls 66 of the anodes are porous and have openings 68 therethrough at a point within the base which is essentially a three-sectioned base comprising in combination:

(a) A lower section comprising bottom current distributing plate 69 to which the anodes are fitted, the lower surface being in electrical contact with anode terminals 24;

(b) An upper section in horizontal parallel relationship to the lower section and comprising lower plate 86 which is electrically conductive and usually formed of a ferrous metal such as steel, and has slots through which anodes 14 extend upwardly, the upper section being spaced apart from the lower section and having compartments 76 therebetween; and (c) Peripheral manifold 81 enclosing peripheral chamber 74 and having olefin inlet 18 thereon, peripheral chamber 74 being in open communication with at least one of compartments 76 by means of at least one aperture through the inner side wall of manifold 81, compartments 76 being in open communication with inner chamber 17 of the anodes.

Figure 3:
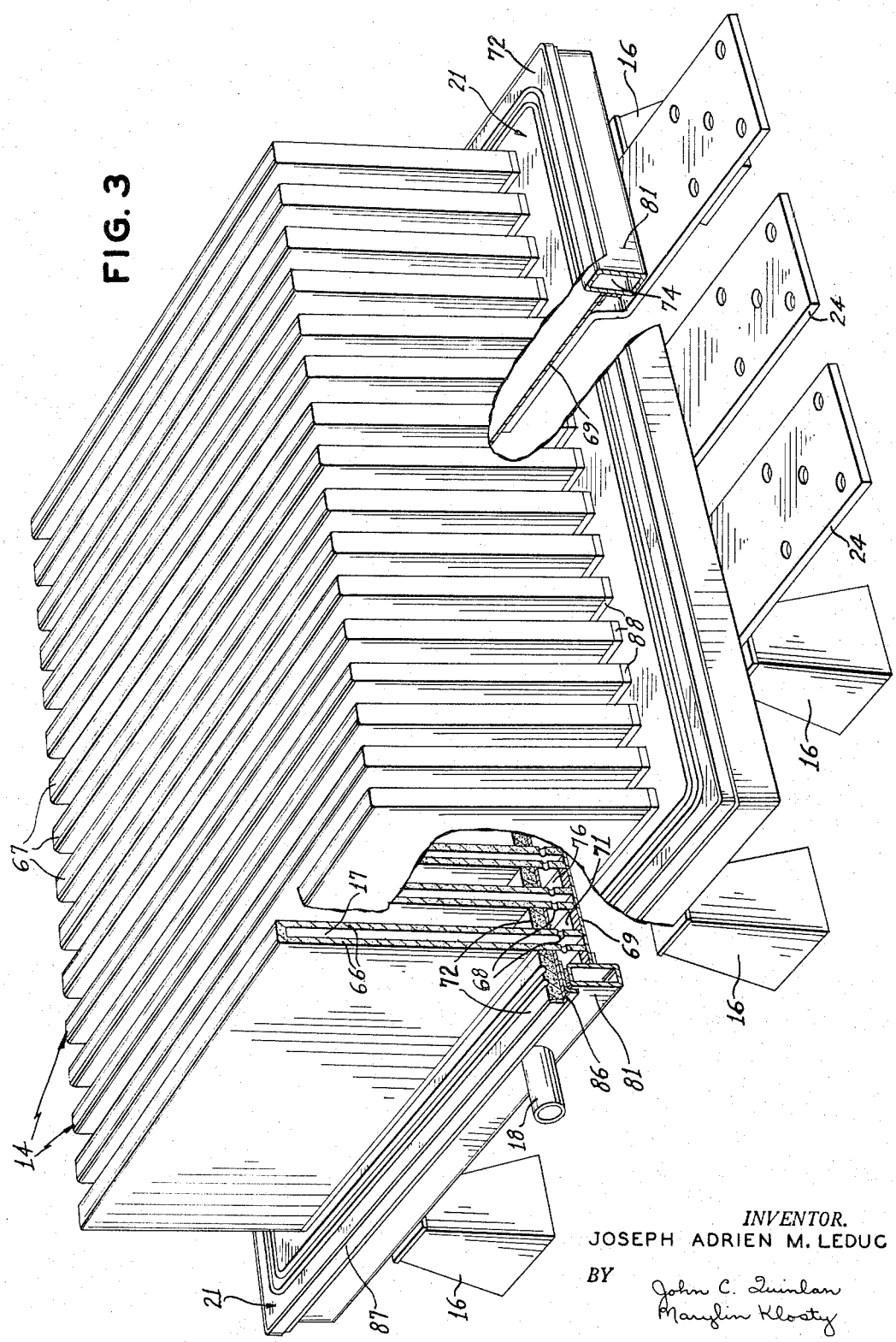

A longitudinal view in cross-section of the anode unit of FIGURE 3 in combination with the cathode unit of FIGURE 2 and the top unit of the assembled cell taken along line 4—4 of FIGURE 1, is shown by FIGURE 4 to which reference is now had.

The lower section of the anode unit comprises an electrically conductive material in which the anodes are secured and, as shown, the lower section comprises two layers. The bottom layer is solid current distributing plate 69 which is formed of an electrolytic grade metal, usually copper, and is the lower enclosure of chamber 17 within each of anodes 14, the porous side walls 66 of the anodes being secured to plate 69 by any suitable means such as screws 83 or force fitted pins. Although not essential but in order to provide additional support for the anodes, the lower section of the base is also provided with top layer 71 which is in contact with the outer surfaces of the lower portion of anodes 14 and extends to the inner wall of peripheral manifold 81 below apertures 77. Layer 71 is formed of an electrical conductor which also may be of copper provided with slots within which side walls 66 of the anodes are fitted and may be an integral part of plate 69 or welded thereto. In order to reduce the total amount of copper, plate 69 is usually surmounted by bonding layer 71 of a less expensive conductor such as lead which also has the advantage of being applied in molten form thereby assuring a tight seal between it and the outer surfaces of the anodes.

The upper section of the anode unit comprises metal plate 86 having peripheral side wall 87 tightly fitted thereto such as by welding to form a pan. In order to electrically insulate the base from the cathode unit of the cell, the pan which is usually formed of steel, contains layer 72 of an insulating and electrically non-conductive material which is suitably cement. Lawer 72 also provides additional support for the anodes, and exposed surface 21 thereof is also the floor of the inner chamber of the assembled cell. In order to minimize erosion and crumbling of top surface 21 of layer 72 by the aqueous medium with which it is in contact during operation of the cell, it may be provided with a protective layer or coating such as a fiberglass mat or laminated polytetrafluoroethylene-glass cloth, laminated polytetrafluoroethylene-asbestos sheet or cloth, a laminated surface containing phenol-formaldehyde polymers (e.g. Haveg) and a material such as rubber or asbestos that can be bonded to the surface 21 which, as shown, is cement. In the assembled cell, lower flange 33 of cell casing 26 of the cathode unit is fitted to cement layer 72 and a liquid tight seal is provided by any suitable means such as double O-ring seal 22 in the form of glass rope, polytetrafluoroethylene impregnated asbestos rope, asbestos rope impregnated with phenol-formaldehyde polymer, or other material not corroded by the aqueous electrolyte medium.

Fitted to the upper and lower sections of the base which have compartments 76 therebetween, is peripheral manifold 81 which as shown is formed of rectangular tubing, usually of steel, although it is to be understood that the manifold may be of other geometric shapes. The manifold is fastened to the upper section by means of rod 82 which extends through alignment plate 78 and steel plate 86, and is threaded at least at the lower end and secured by nut 84. In order to prevent leakage of olefin through the threads, rod 82 is fitted within pipe 85 which extends the full height of the manifold. A gas-tight seal between manifold 81 and the upper section of the base is provided by gasket 79.

In operation olefin reactant is fed to inlet 18 of the peripheral manifold 81 and flows through peripheral chamber 74 therein. Chamber 74 is open to at least one of compartments 76 by means of aperture 77 in the inner wall of manifold 81. The olefin flows through aperture 77 into the adjacent compartment 76 and through openings 68 in that portion of side walls 66 of the anodes between the lower surface of plate 86 and the upper surface of layer 71, and upwardly into hollow chamber 17 of the anodes. Some olefin may of course travel through apertures 68 in the anode blades into the next compartment 76 and into the inner chamber of the next anode.

In order to provide an even and good distribution of olefin into chamber 17 of each anode, manifold 81 preferably has a multiplicity of apertures 77 feeding into the respective adjoining compartment 76 and likewise side walls 66 of the anodes have a plurality of openings 68 therethrough. The particular number of openings such as 77 and 68 depends largely on the dimensions of the cell as to product output. In order to prevent leakage of aqueous electrolyte medium into the anode unit of the cell, a liquid-tight seal 88 which is suitably of an epoxy resin, is provided on that portion of the outer surfaces of hollow anode blades 14 which pass through steel plate 86 and cement layer 72. In operation compartments 76 are filled with olefin as well as chamber 17 of the anodes, the olefin diffusing outwardly through the pores of anode side walls 66 towards the anolyte. In order to confine the olefin within the base assembly and obtain the desired passage and rate of flow of olefin through the pores of the anode, the various parts are connected by gastight seals. Support is provided by any suitable means such as that designated by numeral 73 which extends across the lower surface of plate 69.

Figure 5:
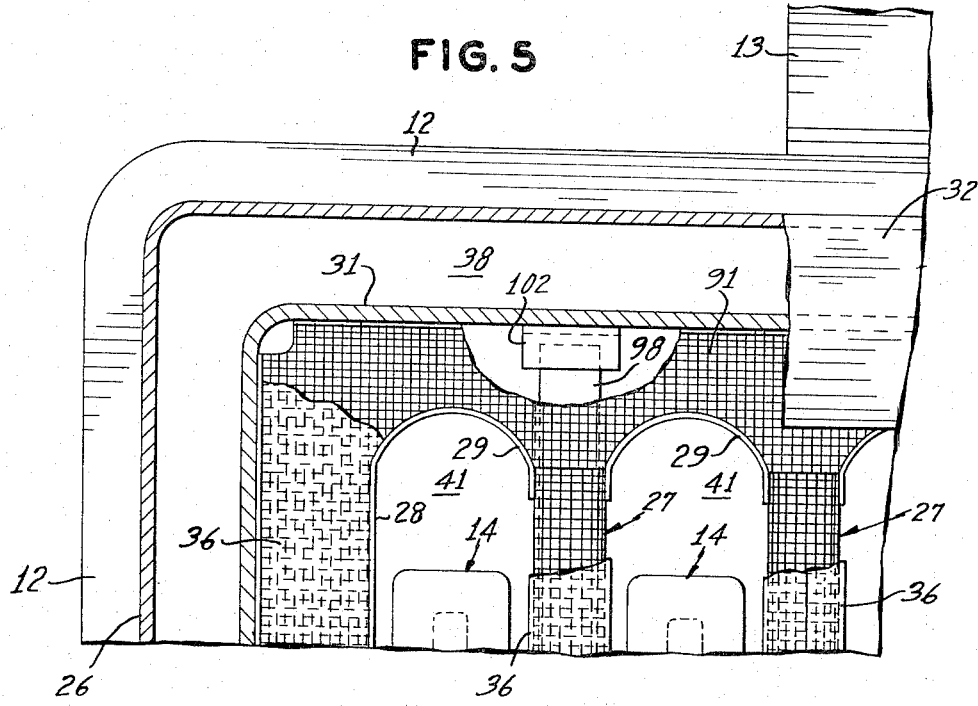
FIGURE 5 is a top view in elevation of the assembled cell of FIGURE 1 taken along line 5—5 of FIGURE 4.

It is seen, therefore, that the anode unit of the cells of this invention is such that olefin reactant is confined therein and its path of flow therefrom is through the pores of anode side walls 66, the olefin reacting at the olefin-anolyte interface to form the halohydrin derivative of the olefin corresponding to the halide of the metal halide electrolyte. The aqueous medium containing the halohydrin compound formed in the anolyte passes through the diaphragm on the foraminous cathodic surfaces of tubular cathodes 27 into cathode compartments 37 and also passes through diaphragm 36 on the peripheral foraminous walls, i.e., end walls 28 and side walls 29, into cathode compartment 39 which, as described above, is enclosed by top foraminous horizontal walls 92 and 91 and lower foraminous walls 94 and 93. The halohydrin reacts with the alkaline catholyte contained in compartments 37 and 39 to form the desired olefin oxide product. Hydrogen is formed on the inner surfaces of cathodes 27 and the outer surfaces of end walls 28 and side walls 29. Some hydrogen is also generated on the lower and upper surfaces, respectively, of the top and bottom foraminous enclosures of peripheral cathode compartment 39 near the point of contact with vertical foraminous walls 29 and 28. The catholyte and cathode gases from compartments 37 pass into peripheral cathode compartment 39 through the slots in foraminous side walls 29 which oppose each of the open ends of cathodes 27, the slots allowing free-flowing fluid communication between compartments 37 and peripheral cathode compartment 39 which together form a continuous cathode compartment. The continuity of the foraminous walls of this continuous cathode compartment is typically illustrated by FIGURE 5 which is a top view in elevation taken along line 5—5 of FIGURE 4. As illustrated by FIGURE 5, side section 91 and the end section shown with diaphragm 36 thereon (and designated by numeral 92 of FIGURES 2 and 4) of the top foraminous enclosure extend between, and are secured to, perforated wall 31 and the upper edges of side walls 29 and end walls 28, respectively, and together form a continuous foraminous top enclosure having diaphragm 36 thereon, of peripheral cathode compartment 39. Side section 91 also is in contact with the top surface of tubular cathodes 27 which are secured in position by means 98 and 102 below the top enclosure as discussed in greater detail in connection with FIGURE 8. Cathode compartment 39 is similarly enclosed at the bottom by a continuous foraminous lower enclosure having diaphragm 36 on the lower surface thereof.

Referring again to FIGURE 4, the catholyte and cathode gases from compartments 37 combine with the catholyte and cathode gases formed in peripheral cathode compartment 39. The combined liquid medium and cathode gases pass through apertures 104 in perforated wall 31 and into outer peripheral cathode gas-liquid separator compartment 38 which is enclosed by cell casing 26, perforated wall 31 and upper and lower flanges 32 and 33, respectively, of the cell casing.

Perforated wall 31 serves two important functions in the cells of this invention particularly when operated on a commercial scale. One advantage is that the agitation of the catholyte as it passes through apertures 104 causes separation from the catholyte of vaporous olefin oxide product and entrained hydrogen gas. Another advantage is that the apertures in the wall allow for rapid passage of the cathode gases from peripheral cathode compartment 39 into outer peripheral compartment 38 which in turn allows for more rapid discharge of the gases from cathode compartments 37. In this manner accumulation of cathode gases and particularly hydrogen gases in the cathode compartment is minimized as is the danger of back pressure which tends to dislodge the diaphragm from the cathodic surfaces. If the diaphragm is disengaged from the foraminous cathodic surface a passageway is provided for the anode gases to escape into the cathode compartments and will evolve with the cathode gases thereby complicating separation of desired products and unreacted olefin. Another important advantage of having a rapid flow of cathode gases from the cathode compartments is that accumulation therein reduces the reactive area of the cathodic surfaces.

The cathode gases pass from compartment 38 and from the cell by means of outlet 47. The aqueous electrolyte medium is discharged from compartment 38 by means of outlet 42 and is passed through a liquid flow breaker designated by numeral 43 of FIGURE 1 the structure and functions of which are discussed in greater detail in connection with the two embodiments illustrated by accompanying FIGURES 19 and 21.

As further illustrated by FIGURE 4, the anode gases evolved from the anode compartment pass upwardly into the free space above the anolyte and exit from the cell through an outlet positioned within dome 54 of the cell. In order to minimize the escape of olefin through the pores of anodes 14 which are not opposed by a reactive cathodic surface, the top surfaces of anodes 14 are either made of a gas impervious electrode material or are coated with a gas impermeable layer 67 usually formed of a nonporous material such as Teflon paint, epoxy coating, etc.

Figure 6:
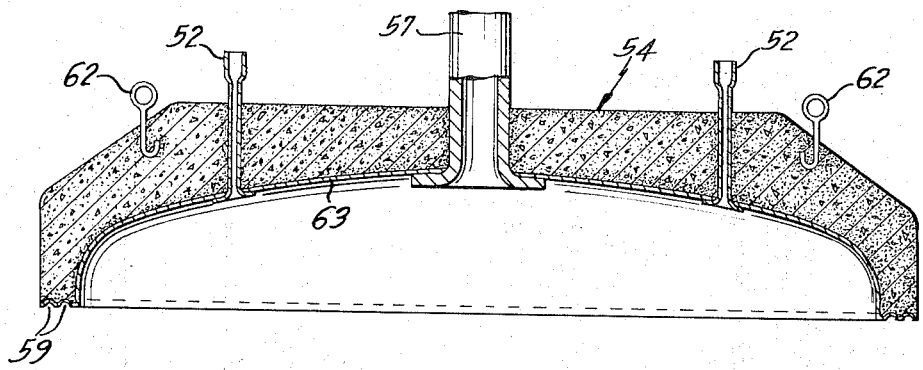
FIGURE 6 is a longitudinal cross-sectional view of the top unit of the assembled cell illustrated by FIGURE 1.

The top section of the cell is also an integral unit and is shown as such by FIGURE 6 inspection of which shows that dome 54 has inlet ports 52 therethrough by means of which the aqueous electrolyte medium is fed to the inner cell chamber such that it flows downwardly by gravity between the reactive anodic and cathodic surfaces. Dome 54 is also provided with anode gas outlet 57, and hooks 62 by means of which the top section is removed from the cell or lowered in place. As shown, the dome is made of cement or concrete and is lined with a protective layer 63 in order to prevent erosion of the lower surface of dome 54. Protective layer 63 may be composed of polytetrafluoroethylene plastic laminated or impregnated glass cloth, phenol-formaldehyde resin laminated or impregnated with glass or asbestos cloth and is bonded to the cement surface of dome 54. It is to be understood that the dome may also be formed of glass or hard rubber laminated with a polymer such as polytetrafluoroethylene or a laminated metal such as titanium without departing from the scope of this invention. In the view of the assembled cell of FIGURES 1 and 4, it is seen that the lower edges of the dome are mounted on upper flange 32 of the cell casing 26 and are provided with grooves 59 to fit the dimensions of double O-ring seal 23 which provides a gas and liquid-tight seal between the cathode unit and the top section.

The source of direct current is supplied to the cell at an intensity between about 22,000 and about 60,000 amperes and the cell is operated at a current density between about 50 and about 200 amperes per square foot of apparent electrode surface, or higher such as up to about 500 amperes per square foot. The cathode and anode terminals which supply current to cathode distributing plate 12 and anode current distributing plate 69, respectively, are shown by FIGURE 7 which is a longitudinal view taken along line 7—7 of FIGURE 4. FIGURE 7 shows that cathode terminals 13 which are fitted to the back of the cathode unit, are in electrical contact with cathode bus bars 12 by means of connecting plate 11. Cathode terminal 13, cathode bus bar 12, connecting plate 11 as well as anode terminals 24, are composed of an electrolytic grade conductor which is usually copper or aluminum. The source of direct current furnished cathode terminal 13 flows through the continuous conductive surface of the cathode unit within which the foraminous cathodic surfaces are secured.

The various parts of the cathodic unit are secured therein to form the integral unit illustrated by FIGURE 2, by suitable gastight securing means such as welding as illustrated by FIGURE 8 to which reference is now had. As shown, foraminous tubular cathodes 27 are supported by a cross-shaped member comprising vertical support bar 96 and horizontal support bar 97. Secured to the vertical support bar 96 at the top and bottom thereof are upper stringer 98 and lower stringer 99 which extend beyond the sides of cathodes 27 to the side walls of perforated plate 31 and engage upper and lower clips 102 and 103 respectively, which are welded to plate 31 as is also shown by FIGURE 7. The stringers are secured in place usually by welding to clips 102 and 103. Support bar 97 and stringers 98 and 99 are in contact with the inner surfaces of tubular cathodes 27 and are usually welded thereto. In order to provide for free flow of the catholyte within cathode compartments 37, the cross-shaped member and stringers have openings 101 therein.

As further illustrated by FIGURE 8, each of the outer vertical surfaces of tubular cathodes 27 is in contact with side foraminous walls 29 which extend at least the full height of tubular cathodes 27, and, as shown, are curved in order to maximize the inner surfaces thereof which are opposed to the side ends of the porous anodes which are positioned within the anode compartments. As shown, the inner edges of side sections 91 and 93 of the foraminous top and bottom enclosures of cathode compartment 39 are scalloped to fit the curvature of side walls 29 and are secured thereto usually by welding, and also are secured to the top and bottom surfaces, respectively, of tubular cathodes 27. The inner edges of end sections 92 of the foraminous top enclosure of cathode compartment 39, in turn, are secured to end walls 28 or are an integral part thereof, end sections 92 being continuous with side sections 91. The end section of the foraminous lower enclosure of cathode compartment 39 which is shown on FIGURE 2, for example, and designated by numeral 94 is similarly associated with the lower edges of end walls 28, and side section 93 of the lower enclosure.

FIGURE 8 also shows that the outer edges of the various sections of the foraminous top and lower enclosures of cathode compartment 39 are in contact with perforated plate 31 and are secured thereto usually by welding. In order to avoid escape of cathode gases from peripheral compartment 39, only that portion of perforated wall 31 which is positioned between the foraminous top and lower enclosures in contact therewith is provided with apertures 104. The outer peripheral compartment 38 in turn is enclosed at the top and bottom by upper flange 32 and lower flange 33, respectively, of cell casing 26, which are also in contact with perforated wall 31 and are secured thereto by gastight securing means such as welding.

In accordance with another embodiment of the cathode unit of the olefin oxide cell of this invention the cathodes are removably attached to the side walls of the inner cell chamber instead of being permanently attached thereto by welding as illustrated by FIGURE 8. Means for removably attaching tubular cathodes 27 within the cathode unit are illustrated by FIGURES 9, 10a, 10b, 11 and 12. The arrangement shown by FIGURES 9, 10a and 10b allows for removal of the cathodes by lifting upwardly or downwardly from the cathode unit. The arrangement illustrated by FIGURES 11 and 12 allows for removal of the cathodes from the side of the cathode unit, the sides of the cell casing being removable as well as the sides of the current distributing plate in association with the outer surfaces thereof as illustrated by FIGURE 13. In each arrangement illustrated by FIGURES 9, 10a, 10b, 11 and 12, each of the open ends of tubular cathodes 27 are provided with means which lockably cooperate with means in association with the side foraminous walls of the cathode unit. The means which is in association with the open ends of the cathode tubes comprises a vertically disposed channel having openings therethrough to allow free passage of electrolyte from the inner cathode compartment 37 through openings or slots in the foraminous side walls of the cathode unit and into the peripheral cathode compartment.

The cathode unit to which tubular cathodes 27 are fastened by the means illustrated by FIGURES 9, 10a and 10b is similar to that illustrated by FIGURE 2, and comprises outer peripheral cathode gas-liquid separator compartment 38 and inner peripheral cathode compartment 39 which are separated by perforated wall 31 having apertures 104. The remaining enclosure of outer compartment 38 is provided by cell casing 26 and upper and lower flanges 32 and 33 thereof. The remaining enclosure of the inner peripheral cathode compartment 39 is foraminous and has a diaphragm in association therewith, and is as described above in connection with FIGURE 2 and the various views thereof except that foraminous side walls 121 are flat (as opposed to curved side walls 29) and the inner edges of the top and lower side sections 122 and 123, respectively, of the top and lower enclosures are straight (as opposed to the scalloped inner edges of foraminous walls 91 and 93). With specific reference to FIGURE 9, foraminous side wall 121 and the opposing side wall, each has secured thereto a number of vertically disposed runners 124 corresponding to the number of cathode tubes 27 to be positioned within the cathode unit. Each of runners 124 comprises center wall 127 having openings 128 therethrough, and side walls 126 and is enclosed at the bottom by foraminous enclosure 133. Side walls 126 of the runner are provided with resilient tension members which extend outwardly therefrom and, as shown by FIGURE 9, are split at least at least at a point near the top and bottom to provide outwardly projecting tension bars 129. Foraminous side walls 121 are also provided with at least one opening in that portion to which runner 124 is secured which openings may be a single longitudinal slot extending the height of the runner or a plurality of openings opposing the openings 128 in runner 124. Support is provided to the foraminous side walls and runner by support rods 131. Each of the open ends of foraminous cathode tubes 27, in turn, is fitted with channel 116 which comprises center wall 118 having slots 119 therein and side walls 117 which contact the inner surfaces of cathodes 27 and are secured thereto usually by welding. Runner 124 and channel 116 are dimensioned so that the channel is slideably received by and tightly fitted to the runner. In order to facilitate sliding of cathode tubes 27 in position downwardly along runner 124, the lower curved outer edges 130 of cathode tubes 27 are set back such that they are in the same vertical plane as center wall 118 of channel 116. By the arrangement of FIGURE 9, cathode tubes 27 are positioned in place merely by sliding them downwardly into the cathode unit such that the channel engages the runner, and are held securely in place by the pressure exerted outwardly by tension bars 129 on side walls 117 of channel 116. When in position, foraminous flanges 132 along the straight outer edges of tubular cathodes 27 fit flatly and tightly against side wall 121. Likewise, the curved upper edges of the tubular cathodes also fit tightly to the side walls, the lower enclosure of the cathode compartments within cathodes 27 being provided by foraminous enclosure 113 fitted across the bottom of runner 124. In operation, catholyte and cathode gases pass freely from the compartments within cathode tubes 27 through openings 119 in channel 116, openings 128 in runner 124 and the openings in side walls 121 into peripheral cathode compartment 39. It is seen, therefore, that by this arrangement, fluid communication and continuity between the cathode compartments within cathodes 27 and peripheral cathode compartment 39 is provided, and the cathode tubes are readily positioned in place and removed by merely lifting the tubes upwardly when it becomes necessary to clean the cell or repair the diaphragm which is deposited on all of the foraminous surfaces.

Another means for removably fastening the cathode tubes within the cathode unit is illustrated by FIGURE 10a. In this illustration, the open ends of cathode tube 27 are provided with vertical channel 136 comprising center wall 138 and side walls 139 which are in contact with the straight inner surfaces of the cathode tube. Center wall 138 is also provided with a plurality of openings 141 and at least the upper and lower openings are provided with spring catch 137. The foraminous side wall 121 of the cathode unit such as that illustrated by FIGURE 9, is in turn, provided with runner 142 comprising back plate 143, front plate 144 and side walls 147. The back and front plates are provided with openings 146, as are the foraminous side walls to which runner 142 is secured. At least those openings in front plate 144 of runner 142 which oppose spring catch 137 have a tapered upper edge 148 to provide a catch-hole. By this arrangement each of cathode tubes 27 fitted at each open end with channel 136 is positioned in place by sliding it downwardly along runners 142 on each opposing foraminous side wall. Spring catch 137 securably fastens the cathode tube to runners 142 by pressure contact on the inner surface of the lower edge of catch-hole 146, the tapered upper edge 148 thereof accommodating the spring catch. Runner 142 of FIGURE 10a is supported by support studs 131 which are conveniently secured to the perforated wall of the cathode unit as shown by FIGURE 9.

A modification of the spring catch type securing means of FIGURE 10a is illustrated by FIGURE 10b. Inspection of FIGURE 10b shows that the means which is in association with the foraminous side walls of the cathode unit comprises rectangular runner 106 having openings 107 through the back and front plates, at least those openings at the top and bottom of the front plate being provided with spring catch 108. Cathode tube 27 is provided at each open end with vertically disposed channel 109 having openings 111 through the center wall thereof and, at least the top and lower openings which oppose spring catch 108, have tapered upper edge 112 and tapered lower 113 to accommodate the spring catch. In positioning cathode tube in place, it is slipped downwardly into the cathode unit such that channel 109 engages the side walls of runner 106, and is held securely in place by spring catch 108 which slips into catch-hole 111.

In accordance with the embodiments illustrated by FIGURES 11 and 12, the cathode tubes are secured in position by locking pins and are removable through the sides of the cathode unit as described in detail in connection with FIGURE 13. As shown by FIGURE 11, the open ends of tubular cathodes 27 are fitted with vertically disposed channel 151 comprising side walls 154 and middle wall 158 having openings 153 therethrough. At least the upper and lower openings are threaded holes 152 and preferably at least one other hole therebetween is threaded. Foraminous side walls 159 of the cathode unit are also provided with holes 161 or a single slot opposing those in channel 151 to provide an open passageway for the flow of electrolyte from the cathode compartment within cathodes 27 to the peripheral cathode compartment enclosed within perforated wall 187, foraminous side walls 159, upper foraminous enclosure 173 and a similar lower foraminous enclosure. Threaded holes 152 of channel 151 are opposed and engaged by locking pins 156 which are threaded at their inner end in the form of a threaded bolt and are at right angles to perforated wall 187 and foraminous side wall 159 and extend therethrough. In order to provide a fluid-tight seal around the threads of bolts 156, the bolts are positioned within and embraced by pipe 157.

Another embodiment of locking pin means for fastening the cathode tubes in place within the cell is illustrated by FIGURE 12 in which locking pin 181 which is within pipe 188, carries at its outer end compression spring 182 and is provided at the inner end with projections 183. The side ends of the cathode tubes are also provided with vertical channel 176 having side walls 179 and middle wall 184 having openings 178. At least the top and bottom openings, designated by numeral 177, are provided with outwardly projecting slots 186 which are at right angles to the circumference of holes 177. Slots 186 are dimensioned so that projections 183 of pin 181 can slip there through. In this arrangement the cathode tubes are aligned with foraminous side walls 159 such that keyed openings 177 oppose locking pin 181, the projections 183 of which are slipped through the keyed openings. The pin is then turned to lock it in place and the cathodes are held tightly to the foraminous side walls by the tension exerted by compression spring 182.

Access to the locking means of FIGURES 11 and 12 is accomplished by providing the cell casing with removable side panels as typically illustrated by FIGURE 13 which is a horizontal cross-sectional view of the cathode unit provided with threaded bolt means 156 of FIGURE 11. FIGURE 13 shows the top of the continuous foraminous vertical wall of the inner cell chamber comprising side walls 159, the top of perforated wall 187, and threaded bolt 156 within pipe 157 and engaged to threaded holes 152 of channel 151. The space between the foraminous walls and perforated wall 187 is the peripheral cathode compartment. Cell casing 162 is provided with removable side panels 163 which are connected thereto by any suitable means such as bolts 164, a fluid tight seal being provided by gasket 166. The space between the cell casing and the perforated wall is the peripheral cathode gas-liquid separator compartment which is enclosed at the top by flange 32 of cell casing 162 and at the bottom by a similar lower flange. The cathode bus bars in association with the outer surface of the cell casing also have removable side panels to allow ready access to the interior of the cell. As shown by FIGURE 13 which is typical of each corner of the cell the cathode bus bar comprises side plates 167 and end plates 168 which are joined by means of connectors 169 which can be curved bars, preformed flat bars, castings or flexible copper braid. The side and end sections of the cathode bus bars are secured to connectors 169 usually by bolts 171 and 172, respectively. The sectioned or split cell casing and cathode bus bars illustrated by FIGURE 13 for providing access to the threaded bolt means which secure the cathode tubes in place, are also applicable to a cathode unit within which the cathode tubes are secured by the keyed-spring means illustrated by FIGURE 12.

It is to be understood that each of the removable cathode tubes 27 of FIGURES 9, 10a, 10b, 11 and 12 can be provided with means positioned therein for further supporting the foraminous surfaces thereof. Such additional support can be provided, for example, by the means illustrated by FIGURE 8 comprising the cross-shaped member and upper and lower stringers 98 and 99. In such case, however, the stringers do not extend beyond the outer edges of the cathode tubes, the stringers and cross-member 97 usually extending to the back of the respective channels vertically disposed within the open ends of the cathode tubes. By the removable means of this invention for securing the cathode tubes in place, the cathodes are readily positioned in place and are readily removed from the cathode unit as it becomes necessary to clean the cell and remove the worn diaphragm on the foraminous cathodic surfaces. Difficulties associated with cleaning and repair of a cathode unit to which each of the cathodes is permanently secured such as by welding are thereby overcome. The half-cathodes at either end of the cell and designated by numeral 28, can be permanently attached within the cathode unit as shown by FIGURE 8 since there is a sufficient gap between them when the cathode tubes are removed, to obtain access to the diaphragm deposited thereon.

The cells of this invention are elevated above floor level and, in order to balance the weight of the cell, it is supported on legs 16 which are typically shown by FIGURES 1 and 3. As illustrated by FIGURES 1 and 3, the weight of the cell is balanced on support legs 16 and each leg is conveniently fastened to peripheral olefin manifold 81 of the anode unit (discussed above in detail in connection with FIGURE 4), by allowing the threaded portion of rod 82 to extend through the top of the support leg securing the rod thereunder. In this manner the upper section of the base, peripheral manifold 81 and support legs 16 are secured by the same means and thereby insulate the cell from the floor.

As in the case of the cathode unit, various alterations may be made of the anode unit of the cells of this invention without departing from the scope of this invention. For example, a modification of the anode unit is shown by accompanying FIGURE 14. In accordance with this embodiment, the upper and lower sections of the base are the same as shown by and discussed in detail in connection with FIGURE 4 and have an olefin chamber enclosed therebetween comprising compartments 76. The difference resides primarily in the form of peripheral manifold 81 which instead of being formed of rectangular tubing as shown by FIGURE 4, comprises U-shaped channel 201 with front plate 202 welded thereto which together enclose chamber 209 which is open to compartments 76 by at least one opening 211 in the vertical wall of channel 201. It is to be understood that instead of the olefin manifold being around the periphery of the base it may be positioned on only one side of the base or on two opposing sides, the remaining side enclosure of the olefin chamber between the upper and lower sections of the base being a solid vertically disposed wall. When the manifold is on two opposing sides of the base, each section thereof is preferably interconnected by a pipe below base plate 69 for supplying olefin feed to chambers 209 within each section, chambers 209 being in open communication with compartments 76 by at least one opening 211 in the vertical wall of channels 201. The manifold is fastened to plate 86 by means of threaded rod 203 which does not extend through the bottom wall of the manifold as shown by FIGURE 4. Rod 203 is secured in place by upper and lower nuts 206 and 207, and washer 204, nut 207 being within cement layer 72 contained within the pan formed by lower plate 86 and side walls 87. In this arrangement the manifold and support legs are held together by means of pins (not shown). It is to be understood, however, that this type of manifold can also be fastened to the upper section of the base and support legs 16 by means including rod 82 shown by FIGURE 4 in which case the use of pins is avoided.

Another embodiment of the anode unit is illustrated by FIGURE 15 to which reference is now had. The base of this anode unit essentially comprises two sections, namely, an upper section in which anodes 14 are secured and a lower olefin manifold which extends the full width and length of the base as opposed to peripheral manifold 81 of FIGURE 4, and encloses olefin chamber 222 to which olefin reactant is supplied by means of inlet 18. Olefin chamber 222 is enclosed at the bottom and top, respectively, by lower rigid plate 214 which may or may not be electrically conductive and is usually made of a ferrous metal such as steel, and upper current distributing plate 216 which is usually made of copper and also forms the bottom wall of the upper section of the base. The side enclosures of olefin chamber 222 are plates 223 which, as shown, are U-shaped and at least one side thereof has olefin inlet 18 therein. A gas tight seal between plate 223 and current distributing plate 216 is provided by gasket 228. The lower manifold is supported by vertical reinforcement brackets 224 having slots 226 therethrough to allow free passage of olefin within chamber 222. Side walls 66 of the porous anodes rest on current distributing plate 216 which, as shown, extends beyond the base and thereby provides the advantage of acting as the anode terminal. Plate 216 is provided with slots 227 to allow free passage of olefin from chamber 222 into inner anode chambers 17. Plate 216 is surmounted by a rigid pan usually of a ferrous metal such as steel and comprises side walls 218 and lower plate 217 having slots therein within which the bottom of the anodes are set. The pan contains a lower bonding layer 219 which is preferably applied by pouring and is usually lead. In order to electrically insulate the anode unit from the cathode unit which is mounted thereon in the assembled cell, the top layer 221 of the upper section of the anode unit comprises an insulator such as cement or concrete which is usually coated with epoxy resin or fiber glass impregnated with polytetrafluoroethylene, in order to avoid erosion of the top surface with which the aqueous medium is in contact during operation of the cell. A liquid tight seal is provided between the inner cell chamber and olefin chamber 222 by protecting layer 229 between the anodes and the layers of the upper section of the base. Side walls 223 of the olefin manifold are fastened to the upper section of the base and support legs 16 by any suitable means such as bolts or pins (not shown). In operating a cell with this type of anode assembly the olefin reactant such as ethylene or propylene is fed through inlet 18 and passes freely through the entire olefin chamber 222 and directly into chambers 17 of each of the anodes. This type of anode unit has several advantages over that of FIGURE 4. For example, in this arrangement the anodic surface which is within the base and which is non-reactive in the sense that it does not oppose a reactive cathodic surface is minimized since the anodes are supported and secured within the top section of the base. Another advantage is that when it becomes necessary to replace the anodes after prolonged use, only the upper section of the base need be disassembled. Another advantage is that the olefin reactant such as ethylene or propylene passes directly from chamber 222 into inner chamber 17 of the anodes and thus the lower portion of side walls 66 of the anodes need not be provided with apertures therethrough.

A further advantage of the form of the base of the anode unit illustrated by FIGURE 15 is that it allows for arranging the cell in a stacked or multidecked arrangement. Such a stacked arrangement is illustrated by FIGURE 16 which comprises two cells of this invention arranged one above the other, although it is to be understood that more than two cells may so be arranged without departing from the scope of this invention. The cathode unit of each of the cells of FIGURE 16 is illustrated by FIGURE 2 and it is to be understood that cathode tubes 27 may be secured therein by welding as shown by FIGURE 8 or by the removable means shown by FIGURES 9 through 12. The anode unit is as illustrated by FIGURE 15 except that lower plate 214 of the upper cell rests on the top surface of dome 252 which is flat and formed of (or coated with) an insulating and electrically nonconductive material and as shown is formed of cement or concrete. Each of the upper and lower cells comprises: (1) the inner cell chamber within which porous hollow anode blades 14 and foraminous tubes 27 having a diaphragm thereon are vertically disposed; (2) the peripheral chamber which is separated from the inner cell chamber by a continuous foraminous wall including half-cathodes 28, and is divided into outer compartment 38 and inner compartment 39 by perforated wall 31, current being supplied to the foraminous surfaces by bus bars 12 around the outer surface of cell casing 26; and (3) olefin chamber 222 within the base of the anode unit between lower wall 214 and bus bar 216, anodes 14 being secured within the top section of the base by extending upwardly through slotted plate 217, bonding layer 219 and insulating layer 221. As shown, direct current is supplied to the anode unit by means of anode terminals 264 which are in electrical contact with bus bar 216. It is to be understood, however, that bus bar 216 may extend beyond the base as shown by FIGURE 15 in which case it also acts as the anode terminal and the use of separate terminals 264 is avoided.

The aqueous electrolyte medium such as brine is fed to each of the stacked cell units which may comprise the complete olefin oxide plant, from manifold 56 by means of branch inlet 251 having flow control device 53 thereon, and to the inner cell chamber of the upper cell by means of subsidiary inlets 259 and 261 which pass through the top of the upper dome 252, and to the inner cell chamber of the lower cell by means of subsidiary inlets 262 which pass through the side of lower dome 252. The brine flows downwardly between the diaphragm on the cathodic foraminous surfaces of the cathode unit and the outer porous surfaces of anodes 14. The brine level is maintained above the top level of the anodes, the desired level being observed by a scale on manometer 263 which is connected to the outer end of pipe 61, the inner end of pipe 61 being in fluid communication with the brine within the inner cell chamber. Olefin reactant passing through olefin feeding manifold 19 passes through branch inlet 256 which carries olefin to each of inlets 18 of side walls 223 of olefin chamber 222, the olefin passing upwardly into the inner anode chambers and reacting at the olefin-anolyte interface. The anode gases which evolve from the anode compartment pass upwardly into the free space above the level of brine and into outlets 253 which extend through the respective side ends of dome 252 of each cell and into common outlet 254 and thence into collecting manifold 58. The cathode gases formed in cathode compartments 37 and peripheral cathode compartment 39 pass through the perforations in wall 31, into peripheral cathode gas-liquid separator compartment 38. The combined cathode gases pass from each of peripheral compartments 38 into individual cell outlets 47 each of which feeds into common outlet 257 which carries the cathode gases to collecting manifold 48. The brine which is discharged from outer peripheral compartments 38 by means of outlets 42 is carried through electrolyte flow interruptors 43 into downcomers 44 which lead into common outlet 258, the brine flowing therefrom into collecting manifold 46. Additional cathode gases evolved from the brine as it passes through flow interruptors 43 is evolved therefrom by means of headers 49 each of which leads into common outlet 257.

By so arranging the cells one above the other, various advantages are realized. For example, the cell is capable of being operated at increased amperage as high as 100,000 amperes or higher per unit. By so operating the cell at an increased amperage, the production capacity of the cell per unit area is correspondingly increased. A further advantage of the arrangement of cells as illustrated by FIGURE 16 is that the tendency towards pressure fluctuation of the exit gases is reduced. Investment costs per unit area are also decreased due to the fact that less piping is required and in addition, this arrangement allows for a parallel electrical connection of the individual cells within the stacked arrangement which further increases the efficiency of the cell and reduces investment costs.

Although the anodes of the cell of FIGURE 1 are shown as rectangular blocks with outer flat surfaces it is to be understood that they may be of other geometric shapes such as square, spherical, etc. with outer surfaces of different contour. For example, the individual anodes may be in the form illustrated by FIGURE 17. This type of anode comprises a series of contiguous tubes 241 each having an inner chamber 242 which is enclosed at the top end by plugs 243, the inner chambers being separated from the next succeeding chamber by side walls 244 of the contiguous tubes. This type of anode has a scalloped outer surface as shown by FIGURE 18. These anodes are also porous and are composed of one of the above-mentioned anodic materials and are fabricated by extrusion or machining. This type of anode provides a larger anodic surface area and thus allows for better contact between the anolyte and olefin reactant. Another advantage is that because these anodes are self-supporting they may be of relatively narrow width thereby allowing an increase in the number of electrodes with which a given cell can be provided and thereby increase the production capacity of the cell. It is to be understood that although the anode units of FIGURES 1, 3, 14, 15 and 16 are shown fitted with anodes having flat outer surfaces each enclosing a single inner chamber they may be fitted with the type of anode illustrated by FIGURE 17 without departing from the scope of this invention. Another type of porous anode of increased surface area is one having a grooved outer surface as illustrated by FIGURE 24 discussed in detail in connection with that figure.

As already described in connection with FIGURES 1 and 16, the aqueous electrolyte medium which is discharged from the electrolytic cell passes through a liquid flow breaker in order to interrupt the continuous flow of the aqueous electrolyte medium and to prevent current leakage from the cell. The breaker which is designated by numeral 43 on FIGURES 1 and 16 also can be used to control the level of liquid within the cell and is thus usually made of glass. Two embodiments of the liquid flow breaker are illustrated by FIGURES 19 and 21 of the accompanying drawings. The breaker illustrated by FIGURE 19 to which reference is now had, comprises in combination:

(a) An elongated cylindrical outer jacket 281 constricted at the top and bottom to provide cathode gas outlet 282 at the top and a liquid outlet 283 at the bottom.

(b) An inner concentric wall 284 which extends upwardly from the base of jacket 281 and surrounds liquid outlet 283, the inner concentric wall 284 being provided with drainage holes 286 at the base thereof;

(c) An upper dome-shaped perforated baffle 287 interposed between gas outlet 282 and the upper portion of said inner wall 284, and connected at its base to the inner surface of jacket 281 by lugs 293, the openings in baffle 287 being designated by numeral 288;

(d) A tubular passageway or inlet 289 angled upwardly through outer jacket 281 and concentric inner wall 284, the inner end being angled upwardly towards perforated baffle 287; and (e) A liquid distributing means 291 preferably in the form of a removable cap fitted on the inner end of passageway 289 and having openings 292 therein, as shown in greater detail by FIGURE 20.

In using this type of breaker the aqueous electrolyte medium from the peripheral gas-liquid chamber of the cell flows through passageway 289 and is forced through apertures 292 of liquid distributing means 291 such that the liquid stream is broken into fine sprays which pass upwardly contacting dome-shaped baffle 287. The aqueous medium flows downwardly from baffle 287 into the compartment defined by the inner surface of jacket 281 and the outer surface of inner concentric wall 284 and passes therefrom through openings 286 downwardly into outlet 283 of the breaker. As the fine sprays of liquid contact the lower surface of baffle 287 additional cathode gases are separated from the liquid and pass upwardly through openings 288 in baffle 287 and exit from the breaker through outlet 282. By varying the dimensions of orifices 292 in removable liquid distributing means 291 the fineness and type of liquid spray can be controlled. Thus, for example, it also is within the scope of the present invention to eject the liquid medium through liquid distributing means 291 in the form of fine jet streams or an atomized spray.

Another embodiment of a suitable electrolyte flow interrupter with downward flow of electrolyte is illustrated by FIGURE 21. This breaker comprises in combination (a) an elongated cylindrical jacket 298 which is constricted at the top and bottom to provide a cathode gas outlet 299 at the top and an electrolyte outlet 301 at the bottom; (b) passageway 302 which extends through the side wall of jacket 298 such that the inner end is angled downwardly towards liquid outlet 301; and (c) at least one liquid distributing means 303 joined to the lower rim of inlet 302 by connectors 307. As shown by FIGURE 21, a second liquid distributing means 304 is positioned below upper means 303 and is joined thereto by connectors 308. Each of means 303 and 304 is conically shaped and is formed of concentrically arranged cones of decreasing diameter, the cones being spaced apart and open at the top and bottom. A top view of upper means 303 taken along line 23—23 of FIGURE 21 is illustrated by FIGURE 23 which shows inner cone 312 within outer cone 311. The sides of each of the concentrically arranged cones of liquid distributing means 303 and 304 are in the form of an open woven pattern made up of criss-crossed strips of a rigid material such as glass, plastic or metal. The open woven nature of the surfaces of the liquid distributing means is typically illustrated by FIGURE 22 which is a cross-sectional view of means 303 taken along line 22—22 of FIGURE 23, and shows outer and inner cones 311 and 312, respectively. In using this form of breaker, the aqueous electrolyte discharged from the electrolytic cell is introduced thereto by means of inlet 302 and passes downwardly therefrom onto the surface of the concentrically arranged cones of means 303 and 304 and trickles downwardly through the openings in the walls thereof into liquid outlet 301. The large surface area provided by this type of liquid distributing means causes further separation of additional cathode gases from the aqueous electrolyte, the cathode gases passing upwardly into outlet 299. It is to be understood that one or more additional means such as 303 or 304 may be positioned below 304, and that each may comprise more than two concentrically arranged cones, without departing from the scope of this invention.

The cell of FIGURE 24 illustrates a simplified form of the apparatus of this invention having a continuous anodic surface of increased surface area, and also illustrates another embodiment of the anode unit. This cell comprises a single anode compartment 321 surrounded by peripheral cathode compartment 322, the wall separating these compartments being defined by continuous foraminous cathodic surface 323 having diaphragm 324 on its inner surface. The outer wall of the cathode compartment is defined by outer casing 326 of the middle or cathodic section and is composed of an electrically conductive material. Positioned within the anode compartment and extending upwardly from the lower anode section, is anode 327. The anode is closed at its upper end and comprises porous electrically conductive surfaces 328 which enclose inner anode chamber 329. Olefin reactant is fed to anode chamber 329 by means of inlet 331 which extends through the base of the anode section. As shown, the anode has vertical grooves 332 along the outer surface of each side, and is fitted on current distributing plate 333 within the base of the anode section and is fastened thereto by any suitable securing means such as screws 334. Current distributing plate 333 is in electrical contact with anode terminal 336 which is formed of an electrolytic grade metal, usually copper, as is plate 333. The anode unit also comprises the base of the cell and, as shown, is a cast cement base 337 having graduated ridges upon which current distributing plate 333 rests. The exposed upper surface of current distributing plate 333 is surmounted by bonding layer 338 which as shown is formed of graphite although it may also be another electrically conductive material such as lead. The top surface of bonding layer 338 also constitutes the floor or lower surface of the anode compartment and, since the aqueous electrolyte is in contact therewith during operation of the cell, it is usually covered with a protective coating 339 such as bonded fiber glass cloth.

The outer casing 326 of the middle section of the cell has flanges 341 and 342 which extend outwardly from the top and lower edges, respectively. In the assembled cell, the lower flange is mounted on the upper surface of base 337 and, in order to provide a liquid tight seal between the anode and cathode sections, gasket 343 is positioned therebetween and is suitably formed of asbestos or polytetrafluoroethylene plastic. The various walls of the cathodic section including outer casing 326 and foraminous walls 323 are formed of an electrically conductive material such as steel, and electric current is supplied thereto by means of current distributing plate 344 which is usually formed of electrolytic grade copper. The middle section is also provided with thermocouple 356, and outlets 346 and 347 by means of which the cathode gases and aqueous electrolyte medium, respectively, are withdrawn from peripheral cathode compartment 322. Foraminous cathodic walls which are suitably made of a steel screen are supported by posts 348.

The top section comprises cast cement dome 349 provided with inlet 351 by means of which the aqueous electrolyte medium is fed to the gap between the outer surfaces of anode 327 and diaphragm 324, and outlet 352 by means of which the anode gases exit from the cell. In the assembled cell, dome 349 is mounted on upper flange 341 of cell casing 326 and gasket 353 is positioned therebetween.

The following examples are offered for a further understanding of operation of the olefin oxide cells of this invention and are not to be construed as unnecessarily limiting thereto.

*Example 1*

This example demonstrates specific operation of the cell illustrated by FIGURE 1 and the various units and views thereof illustrated by FIGURES 2 through 8. The anode unit shown by FIGURE 3 is fitted with sixteen porous hollow anode blades 14 each of which is composed of graphite and secured to copper current distributing plate 69. The cathode unit illustrated by FIGURE 2 is mounted on the anode unit such that anodes 14 are positioned within anode compartments 41 in alternating spaced relationship to cathode tubes 27 of which there are fifteen, the outer surfaces of each of the end anodes being opposed by half-cathodes 28. The foraminous surfaces of tubular cathodes 27, the peripheral foraminous wall of the inner cell chamber including side walls 29 and half-cathodes 28, and the upper and lower enclosures of peripheral cathode compartment 39 including upper sections 91 and 92 and lower sections 93 and 94 as shown by FIGURE 4, are formed of a screen (6 mesh, 0.09 diameter wire steel cloth). A diaphragm 36 of asbestos fiber is deposited on the outer surfaces of cathode tubes 27, on the inner surfaces of side walls 29 and half-cathodes 28, and on the upper and lower surfaces, respectively, of the upper and lower foraminous enclosures of the peripheral cathode compartment 39. The gap between the outer surfaces of anodes 14 and cathodes 27 is approximately 0.38 inch, the gap between the outer sides of the end anodes and end walls 28 being about 0.5 inch. Brine containing 0.75 pound of dissolved sodium chloride per gallon of water and having a pH of 11 is charged to inlets 52 within dome 54 from manifold 56 by means of inlet 51 at a rate of 835 gallons per hour, or a daily feed of 172,600 pounds of brine. The brine flows downwardly by gravity until the desired level within the inner cell chamber is reached which level is observed by means of a brine level indicator scale on a manometer (not shown) which is external to the cell and connected to pipe 61 which in turn is in fluid communication with the brine within the inner cell chamber. In accordance with preferred operation of the apparatus of the present invention, the brine level is maintained above the top level of anodes 14. The aqueous medium as charged to the cell is at a temperature of about 100° F., and the temperature of the aqueous medium as it exits from the cell through outlet 42 is about 150° F., the increase in temperature being caused by the potential drop across the cell. Thus the cell is operated at an average temperature of about 125° F., and at substantially atmospheric pressure. A refinery stream of propylene rich gas containing 90 mol percent propylene and 10 mol percent propane is used as the olefin reactant and is charged to olefin inlet 18 from manifold 19 at a rate of 4.82 pound-moles per hour. The gaseous reactant is introduced at a slight back pressure of about 12 pounds per square inch gauge to aid its diffusion through the pores of anodes 14. A source of direct current is supplied to anode terminals 24 and cathode terminals 13 (shown by FIGURE 7) at an intensity of 31,000 amperes. The cell therefore is operating at a current density of 100 amperes per square foot of apparent electrode surface. The resulting potential drop across call terminals 24 and 13 is 3.7 volts. Propylene chlorohydrin is produced in the anolyte which is at an acid pH and is circulated to cathode compartments 37 within cathodes 27, and peripheral cathode compartment 39, by the direction of flow of the aqueous medium, passing through the diagram on the cathodic foraminous surfaces. The propylene chlorohydrin reacts in the cathode vicinity which is at an alkaline pH to form propylene oxide. The acidity of the anolyte and the alkalinity of the catholyte are maintained by having the diaphragm as a barrier between the anode and cathode compartments. Under these conditions of operation, dichloropropane also is formed in the anode compartment. The anode gases comprising dichloropropane, unreacted propylene, propane and water vapor, pass upwardly into the free space above the level of the anolyte and exit from the cell by means of outlet 57 within dome 54, the dichloropropane, propylene and propane exiting at a rate of 0.12, 3.61 and 0.538 pound-mole per hour, respectively. In addition to propylene oxide, hydrogen gas is also generated within the cathode compartment and is substantially prevented from passing into the gaseous anode effluent stream by the diaphragm on the foraminous cathodic surfaces. The cathode gas effluent containing volatilized propylene oxide and hydrogen are rapidly discharged for the foraminous cathodic surfaces by the passageways provided by apertures 104 in perforated wall 31 as discussed above, and exit from peripheral compartment 38. Hydrogen and volatilized propylene oxide product pass from compartment 38 into outlet 47 at a rate of 1.21 and 0.22 pound-moles per hour, respectively, and into cathode gas collecting manifold 48. The aqueous electrolyte medium is discharged from peripheral compartment 38 by means of outlet 42 and into breaker 43 at a rate of 20,000 gallons per day. The rate of flow of the propylene oxide, sodium chloride, sodium hydroxide and water contained in the brine solution as it exits from breaker 43, on a pound-mole per hour basis, is 0.871, 9.9, 0.24 and 363.5, respectively. After treatment to separate dissolved propylene oxide, the brine is further treated as required to remove any sludge, adjust the pH, etc., and is recycled to the cell. In so producing propylene oxide in the apparatus of this invention it is seen that a large anodic surface area is provided, the anode gases and cathode gases are recovered as separate effluent streams and a relatively high percentage of vapors of propylene oxide product is evolved directly from the cell in the cathode gases.

*Examples 2–5*

In this series of experiments, the cell of FIGURE 24 is fitted with a porous graphite blade 327 which is 4 inches wide, 7 inches in length and 10 inches in height. The outer surfaces of the anode are provided with longitudinal grooves 332 which are 3/16 of an inch wide and 3/16 of an inch deep. The cathodic surface 323 is a stainless steel screen (No. 7 mesh -0.063 inch in wire diameter) having a diaphragm 324 of fibrous asbestos (1/16 of an inch in thickness) on the surface opposed to the anode. The width of the gap between the opposed cathodic and anodic surfaces is 0.50 of an inch. The apparent area of the electrodes is about 1.3 square feet excluding the area contributed by the grooves. The top surface of anode 327 is coated with fiber-glass cloth which is bonded to the top surfaces of graphite layer 338 and cement base 337 by epoxy resin. Gaskets 343 and 353 between the units of the cell are formed of asbestos coated polytetrafluoroethylene plastic. In these examples, an aqueous solution of sodium chloride containing 90 grams per liter of dissolved sodium chloride is fed to the cell by means of inlet 351 positioned within the cast cement 349 of the cell, at a rate of 178 cc. per minute until the anode which extends above the level of the cathodic surface is fully immersed in the aqueous medium. Heat is provided to the aqueous medium by means of a steam jacket (not shown) until the temperature of the aqueous medium is about 125° F. Ethylene is fed to the inner chamber 329 of the anode by means of inlet 331 positioned within the anode unit, at a rate of 2850 cc. per minute. A source of direct current is supplied to the cell at an intensity of 97 amperes, the cell operating at a current density of 70 amperes per square foot of apparent electrode surface. The resulting potential drop across the cell ranges between about 3.8 and about 3.9 volts. While maintaining these conditions of continuous flow of the aqueous electrolyte medium and of the ethylene reactant, the anode gases are continuously evolved from anode compartment 321 and pass out of the cell through outlet 352 positioned in the dome of the cell. The anode gases are passed through two traps, the first of which is maintained at a temperature of about 0° C., the second being maintained at a temperature of about minus 80° C., in order to separate dichloroethylene and any ether by-product from excess olefin. The cathode gases evolving from cathode compartment 322 exit therefrom through outlet 346 and are passed through a cold trap at 0° C., and two additional traps maintained at a temperature of minus 80° C. to separate ethylene oxide product from the hydrogen gas. Aqueous medium is continuously withdrawn from peripheral cathode compartment 322 and is passed through a water-cooled condenser and then through a gas-liquid separator maintained at a temperature of about 30° C. wherein additional vapors of ethylene oxide are separated from the aqueous medium. Ethylene chlorohydrin concentration in the anolyte during operation of the cell is followed by sampling thereof by means 354.

The specific operating conditions and results of this series of experiments after the indicated number of hours of continuous operation are given in the following Table I.

The values given in Table I for "theoretical organic product" is defined as 95 percent of one-half of the number of faradays for the given run, the average chlorine efficiency of the cell being about 95 percent. The values for the yields of total organic product, ethylene oxide and dichloroethylene are the respective ratios of the total organic product produced, total ethylene oxide and total dichloroethylene to the theoretical organic product, expressed in terms of percent. The values set forth in Table I for the selectivity in which the ethylene oxide is produced, are the ratios of total ethylene oxide to the total organic product produced, expressed in terms of percent. Hydrogen efficiency is defined as the ratio of hydrogen yield to one-half of the number of faradays, expressed in terms of percent.

TABLE I.—PRODUCTION OF ETHYLENE OXIDE

| | Example Number | | | |
|---|---|---|---|---|
| | 2 | 3 | 4 | 5 |
| Conditions: | | | | |
| Duration, hours | 8 | 16 | 32 | 52 |
| Brine concentration, grams/liter | 90 | 90 | 90 | 90 |
| Brine flow rate, cc./minute | 178 | 178 | 178 | 178 |
| pH of brine | 11 | 11 | 11 | 11 |
| Cell temperature, °F | 125 | 125 | 125 | 125 |
| Ethylene flow rate, cc./minute | 2,850 | 2,850 | 2,850 | 2,850 |
| Cell voltage, volts | 3.85 | 3.85 | 3.85 | 3.85 |
| Applied current, amperes | 97 | 97 | 97 | 97 |
| Current density, amperes/ft.$^2$ | 70 | 70 | 70 | 70 |
| Faradays | 28.96 | 28.96 | 28.96 | 28.96 |
| | | | | 14.46 |
| Products (Basis—8 hour period): | | | | |
| Hydrogen, moles | 14.12 | 13.87 | 14.37 | |
| Total chlorine in exit brine, equivalents/liter | 0.001 | 0 | 0 | 0.001 |
| OH- in exit brine, equivalents/liter | 0.057 | 0.060 | 0.070 | |
| Cl- in exit brine, normality | 1.45 | 1.54 | 1.55 | |
| Ethylene chlorohydrin in anolyte, volume percent | 1.1 | | 2.76 | |
| Total ethylene oxide, moles | 10.08 | 10.13 | 9.84 | 9.57 |
| In cathodic overhead | 0.64 | 0.64 | 0.97 | 1.46 |
| In brine | 9.44 | 9.49 | 8.87 | 8.1 |
| Total dichloroethylene, moles | 1.79 | 2.06 | 1.56 | 1.75 |
| Total ether, moles | 0.06 | 0.03 | 0.04 | 0.06 |
| Total glycol, moles | 0.00 | 0.00 | 0.00 | 0.00 |
| Total organic products, moles | 12.18 | 12.46 | 11.52 | 11.54 |
| Theoretical organic products, moles | 13.76 | 13.76 | 13.76 | 13.76 |
| Results: | | | | |
| Ethylene feed conversion, percent | 18.1 | 16.7 | 17.3 | 18.6 |
| Total product yield, percent | 88.5 | 90.5 | 83.7 | 83.8 |
| Ethylene oxide selectivity, percent | 88.4 | 81.4 | 85.4 | 83.0 |
| Hydrogen efficiency, percent | 97.5 | 95.3 | 99.3 | 99.9 |

Examples 6–10

In another series of experiments, the procedure of the above Examples 2 to 5 is repeated except that propylene is used as the olefin reactant instead of ethylene to produce propylene oxide. In Examples 9 and 10, the anode is of the type illustrated by FIGURE 24 having longitudinal grooves on the outer surfaces thereof and in Examples 6 to 8, an anode having flat outer surfaces is used in place of the grooved anode. The specific operating conditions and results of these runs are given in the following Table II.

TABLE II.—PRODUCTION OF PROPYLENE OXIDE

|  | Example Number | | | | |
| --- | --- | --- | --- | --- | --- |
|  | 6 | 7 | 8 | 9 | 10 |
| Conditions: | | | | | |
| Duration, hours | 18 | 30 | 39 | 78 | 86 |
| Brine concentration, grams/liter | 90 | 90 | 90 | 90 | 90 |
| Brine flow rate, cc./minute | 177 | 177 | 177 | 177 | 177 |
| pH of brine | 11 | 11 | 11 | 11 | 11 |
| Cell temperature, °F | 125 | 125 | 125 | 125 | 125 |
| Propylene flow rate, cc./minute | 2,600 | 2,600 | 2,600 | 2,600 | 2,600 |
| Cell voltage, voltage | 3.9 | 3.9 | 3.9 | 3.9 | 3.9 |
| Applied current, amperes | 97 | 97 | 97 | 97 | 9.7 |
| Current density, amperes/ft.$^2$ | 70 | 70 | 70 | 70 | 70 |
| Faradays | 28.96 | 28.96 | 33.84 | 28.96 | 28.96 |
| Products (Basis—8 hour period) | | | | | |
| Hydrogen, moles | 13.48 | 13.43 | [1] 15.88 | 13.3 | 14.6 |
| Total chlorine in exit brine, equivalents/liter | 0.002 | 0.002 | 0.002 | 0.002 | 0.002 |
| OH− in exit brine, equivalents/liter | 0.035 | 0.033 | 0.034 | 0.046 | 0.055 |
| Cl− in exit brine, normality | 1.46 | 1.46 | 1.67 | 1.41 | 1.46 |
| Propylene chlorohydrin in anolyte, volume percent | 1.18 | 1.18 | | | |
| Total propylene oxide, moles | 9.95 | 11.24 | 12.54 | 10.5 | 10.6 |
| In cathodic overhead | 1.08 | 1.20 | 1.27 | 0.9 | 1.4 |
| In brine | 8.87 | 10.04 | 11.27 | 9.6 | 9.2 |
| Total dichloropropane, moles | 1.81 | 1.99 | 2.42 | 1.56 | 1.52 |
| Total ether, moles | 0.03 | 0.05 | 0.09 | 0.016 | 0.02 |
| Total glycol, moles | 0.00 | 0.00 | 0.00 | 0.00 | 0.00 |
| Theoretical organic products, moles | 13.76 | 13.76 | 16.07 | 13.76 | 13.76 |
| Total organic products, moles | 11.99 | 13.47 | 15.27 | 12.22 | 12.26 |
| Results: | | | | | |
| Propylene feed conversion, percent | 21.5 | 20.0 | 20.2 | 19.3 | 20 |
| Total product yield, percent | 87.1 | 97.6 | 95.0 | 88.8 | 89.1 |
| Propylene oxide selectivity, percent | 83.0 | 83.5 | 82.2 | 85.9 | 86.4 |
| Hydrogen efficiency, percent | 93.1 | 92.8 | 93.9 | 92 | 101.0 |

[1] Basis, 9 hour period.

As shown by the data of Tables I and II above, the apparatus of this invention allows for the selective production of olefin oxide product. As specifically demonstrated by the data of Table II, propylene oxide was produced in improved selectivity by using the grooved anodes of the type illustrated by FIGURE 24. It is to be understood that, although the anode of FIGURE 24 is provided with straight vertical grooves, the anode may be provided with grooves which provide other than a straight upward path of olefin such as grooves having a zigzag or sinuous contour without departing from the scope of this invention.

Although the operation of the electrochemical cells of this invention has been described specifically in connection with the use of ethylene and propylene as the olefin reactant, it is to be understood that the apparatus is also applicable to the production of oxides of other olefins which may be normally gaseous, liquid or solid. When solid, the olefin is charged to the vicinity of the anode dissolved or dispersed in any suitable liquid solvent such as a paraffinic or aromatic hydrocarbon or mixtures thereof including petroleum fractions such as hydrogenated kerosene, etc. The solution of olefin or a normally liquid olefin is fed to the inner anode chambers by suitable pumping means and also reacts at the liquid olefin-anolyte interface. Suitable types of olefins which may be used are: the alkylenes of the homologous series $C_nH_{2n}$ wherein $n$ is an integer from 2 to about 12 such as ethylene, propylene, butene, pentene, hexene, heptene . . . dodecene, etc.; olefins in which the double bond is in a non-terminal position such as 2-butene, 2-pentene, etc.; branched olefins such as isobutene, isopentene, 4-ethyl-2-hexene, as well as branched compounds in which the double bond is in the side chain such as 2-methenepentane and alkenyl compounds; and cyclic olefins such as cyclopentene, cyclohexene, etc. Polyolefins are also useful as feed to the vicinity of the anode and include those containing isolated, cumulative or conjugated double bonds such as diallyl, allene, butadiene, isoprene and 2,3-dimethylbutadiene. In addition to the above, olefins substituted with aryl and halogen groups also may be used, typical examples of which are styrene, stilbene and allyl chloride.

In addition to sodium chloride, the metal halide electrolyte may be any other water soluble compound whose corresponding hydroxide is also water soluble. Usually employed are the metal halides of the alkali metals including sodium, potassium and lithium halides, although alkaline earth metal halides are suitable as well as mixed electrolytes. The chlorides are usually employed because of their greater availability. However, in other instances the choice of halide will be governed by the ultimate use of the dihalo derivative of the olefin which is formed in varying quantities at the anode. Thus, when it is desired to recover the dihalo by-product as the dichloro compound, metal chloride is used; when the dibromo derivative is desired, a metal bromide is used, etc.

It is to be further understood that although the above examples describe specific operating conditions of temperature, the process which is effected in the apparatus of this invention, may be carried out at a temperature which is usually between about 90° F. and about 200° F. Similarly the process may be effected either at substantially atmospheric pressure or super atmospheric pressure such as up to about 20 atmospheres in which case, however, the various units of the cell are interconnected by appropriate securing means such as bolts, etc.

It is apparent from the teachings of this invention that particular apparatus is provided for the production of olefin oxides electrochemically from an olefinic compound, water and electrical energy using an aqueous medium comprising a metal halide as electrolyte, the metal halide being regenerated in situ within the cell. It is to be understood, however, that certain embodiments of the apparatus of this inveniton are also applicable to other electrolytic cells of the diaphragm type and constitute improvements therein. Thus, although the removable means for securing the hollow foraminous cathodes to the foraminous side walls of the inner cell chamber, illustrated by FIGURES 9–13 of the accompanying drawings, has been described with particular reference to the olefin oxide cells of this invention, hollow electrodes having a fluid permeable diaphragm in association therewith of any electrolytic cell can be secured within the cell in the same manner without departing from the scope of this invention. For example, an electrolytic cell in which molecular chlorine is produced and recovered as a product of the process by the well-known electrolysis of aqueous solutions of sodium chloride, can be provided with a cathode unit having an outer cell casing and an inner peripheral foraminous wall with a peripheral cathode compartment therebetween, and having hollow foraminous cathodes with open side ends provided with the means illustrated by FIGURES 9–13 which co-act with the respective illustrated means secured to the two opposite side walls of the peripheral foraminous wall to removably fasten the hollow cathodes within the cathode unit. Similarly, other electrolytic cells of the diaphragm type in which cathode gases are generated including those in which a volatilizable product is produced in the cathode compartment may be provided with a cathode unit comprising a peripheral chamber separated into an outer compartment and an inner compartment with free-flowing fluid communication therebetween by means of the perforated dividing wall described herein, without departing from the scope of this invention. For example, an electrolytic cell of the diaphragm type in which molecular chlorine is generated and recovered as a product of the process by the electrolysis of aqueous sodium chloride solutions is advantageously provided with a cathode unit of the type illustrated by FIGURE 2 comprising the two-compartmented peripheral chamber, the openings in the perforated wall between the two compartments causing more rapid discharge of hydrogen gas from the vicinity of the cathodic surfaces having the diaphragm thereon. Various other modifications and applications of the apparatus of this invention may become apparent to those skilled in the art from the teachings of this invention without departing from the scope thereof.

Having described my invention, I claim:

1. An electrochemical cell for the production of olefin oxide from an olefinic compound, water and electrical energy which comprises in combination: at least one anode compartment adjacent to a cathode compartment and in fluid communication therewith by means of a foraminous cathodic surface having a fluid permeable diaphragm in association therewith; a cell base within which there is secured at least one anode comprising porous side walls and being in the form of a plurality of contiguous tubes each of said contiguous tubes having an inner hollow chamber, said anode extending upwardly from said base into said anode compartment such that said anode is in spaced relationship to said foraminous cathodic surface, said base being provided with means adapted to feed an olefinic reactant to the inner chambers of said anode; inlet means for supplying an aqueous electrolyte medium to said anode compartment; and means adapted to withdraw an effluent stream comprising olefin oxide produced in said cathode compartment from said cell.

2. An electrochemical cell for the production of olefin oxide from an olefinic compound which comprises in combination: an outer peripheral chamber and an inner cell chamber separated by a foraminous wall, the outer wall of the peripheral chamber being an outer cell casing; said inner cell chamber comprising at least one anolyte-containing anode compartment and at least one catholyte-containing cathode compartment in fluid communication with said anode compartment by means of a foraminous cathodic surface having a diaphragm in association therewith; a cell base upon which said outer cell casing is mounted and comprising current distributing means in electrical association with at least one vertically disposed anode secured within the base and extending upwardly from the base into said anode compartment such that said anode is spaced apart from said inner foraminous wall and said foraminous cathodic surface, said base having a chamber enclosed therein and being provided with inlet means adapted to feed an olefinic compound to said chamber, said chamber within the base being in fluid communication with anolyte in the anode compartment by means of a porous surface; inlet means for supplying an aqueous electrolyte medium to said anode compartment; and outlet means adapted to withdraw an effluent stream comprising olefin oxide produced in said cathode compartment from said cell.

3. The electrochemical cell of claim 2 in which the anode has a channeled outer surface.

4. The electrochemical cell of claim 2 in which the current distributing means extends beyond the base, the extension thereof being the anode terminal.

5. An electrochemical cell for the production of olefin oxide from an olefinic compound which comprises in combination: a peripheral chamber and an inner cell chamber, said inner cell chamber comprising at least one anolyte-containing anode compartment and at least one catholyte-containing cathode compartment, said anode compartment being separated from said cathode compartment by means of a foraminous cathodic surface having a diaphragm in association therewith, and said cathode compartment being in open communication with said peripheral chamber; a cell base the top surface of which defines the lower surface of said inner cell chamber and within which there is secured at least one anode which extends upwardly therefrom into said anolyte-containing anode compartment, said anode comprising an inner chamber separated from anolyte in the anode compartment by means of a porous anodic surface, said anode being closed at its upper end and having an opening in the lower portion positioned within the base, said cell base having a chamber enclosed therein in fluid communication with the inner chamber of the anode by means of said opening in the lower portion of the anode and being provided with current distributing means in electrical association with said anode; inlet means in association with the cell base adapted to feed an olefinic compound to said chamber within the base; separate inlet means adapted to feed an aqueous electrolyte medium to said anode compartment; and outlet means adapted to withdraw olefin oxide product produced within the cell from the cathode compartment.

6. An electrochemical cell for the production of olefin oxide from an olefinic compound which comprises in combination: an outer chamber and an inner cell chamber separated by a foraminous wall, the outer wall of the peripheral chamber being an outer cell casing; said inner cell chamber comprising at least one anolyte-containing anode compartment and at least one catholyte-containing cathode compartment, said anode compartment being separated from said cathode compartment by means of a foraminous cathodic surface having a diaphragm in association therewith; a cell base upon which said outer cell casing is mounted and within which there is secured at least one anode which extends upwardly from the cell base into said anolyte-containing anode compartment, said anode comprising a porous surface and an inner chamber separated from anolyte in the anode compartment by means of said porous surface, said cell base comprising an upper section and a lower section with a chamber therebetween, each of said lower and upper sections of the base comprising a horizontally disposed rigid plate at least one of which is current distributing means in electrical association with said anode, said chamber within the base being in fluid communication with said inner chamber of the anode; inlet means in association with the cell base adapted to feed an olefinic compound to said chamber within the base; separate inlet means adapted to feed an aqueous electrolyte medium to the cell; and outlet means adapted to withdraw aqueous medium from the cell.

7. An electrochemical cell for the production of olefin oxide from water, an olefinic compound and electrical energy which comprises in combination:
(a) a peripheral chamber and an inner cell chamber separated by a peripheral foraminous wall, the outer wall of the peripheral chamber being defined by an electrically conductive outer casing;
(b) a plurality of anolyte-containing anode compartments within said inner cell chamber in alternating relationship to a plurality of catholyte-containing cathode compartments enclosed within hollow foraminous cathodes having open side ends and extending across the inner cell chamber between and in communication with two opposing side walls of said peripheral foraminous wall having openings therethrough such that there is free-flowing fluid communication between said cathode compartments and said peripheral chamber, the outer surface of said foraminous cathodes together with that portion of the side walls of said peripheral foraminous wall between said hollow cathodes forming a continuous foraminous surface and constituting the vertical walls of said anode compartments, said vertical walls of the anode compartments having a diaphragm in association therewith,
(c) a cell base having an electrically insulating material at least about the periphery thereof and upon which said electrically conductive outer cell casing is mounted, said cell base being provided with at least two horizontally disposed rigid plates positioned in spaced and substantially parallel relationship and having a chamber therebetween, the side enclosure of said chamber being a vertically disposed wall positioned between said horizontally disposed rigid plates, at least one of said horizontally disposed rigid plates comprising current distributing means having a plurality of anodes set thereon, said anodes comprising a porous surface and extending upwardly from the said rigid plate comprising current distributing means and into said anode compartments within said inner cell chamber, said cell base being further provided with inlet means adapted to feed an olefinic compound to said chamber within the base, said chamber within the base being in fluid communication with anolyte in said anode compartments by means of said porous surface of the anodes;
(d) inlet means adapted to supply an aqueous electrolyte medium to the anode compartments;
(e) a cell cover provided with outlet means adapted to withdraw effluent from the anode compartments; and
(f) outlet means in association with said peripheral chamber adapted to withdraw aqueous medium from the cell.

8. An electrochemical cell which comprises in combination a base having secured therein a plurality of rigid anodes spaced apart from one another and extending upwardly from said base; an outer cell chamber and an inner cell chamber separated by a foraminous wall; a plurality of hollow foraminous cathodes with open side ends extending across said inner cell chamber between and in association with two opposing sides of said foraminous wall, each of said hollow foraminous cathodes having a cathode compartment therein and being in spaced, alternating relationship to said anodes which extend upwardly from said base; a rigid member in association with each of the opposing sides of the foraminous wall between which the hollow cathodes extend, said rigid member being provided with means which engages and lockably cooperates with opposing means in association with a rigid member positioned at each open side end of the hollow cathodes such that the hollow cathodes are removably secured to said foraminous wall; an open passageway between the cathode compartment within each hollow cathode and said outer cell chamber such that there is free-flowing fluid communication therebetween; inlet means adapted to feed an aqueous electrolyte medium to the inner cell chamber between the opposing anodic and cathodic surfaces; and outlet means in association with said outer cell chamber adapted to withdraw aqueous electrolyte medium from the cell.

9. An electrochemical cell for the production of olefin oxide from an olefinic compound, water and electrical energy which comprises in combination: at least one anode compartment and at least one cathode compartment in fluid communication with said anode compartment by means of a foraminous cathodic surface having a fluid permeable diaphragm in association therewith; a cell base having an olefin chamber enclosed therein and comprising an upper section and a lower section spaced apart from one another with said olefin chamber therebetween, said upper section comprising a lower rigid plate having at least one slot therethrough, said lower section comprising a current disrtibuting plate having at least one anode set thereon, said anode having an inner hollow chamber enclosed by the top and side walls of the anode and at the bottom by said current distributing plate, said anode extending upwardly from said current distributing plate through said olefin chamber and through the slot in said lower rigid plate of said upper section into said anode compartment in spaced relation to said foraminous cathodic surface, at least that portion of the side walls of said anode which extends into said anode compartment being porous and that portion of the side walls of said anode which extends through the olefin chamber of the base having at least one aperture therethrough to provide an open passageway between said olefin chamber and said inner hollow chamber of the anode, and inlet means adapted to feed an olefin reactant to the olefin chamber of said base; inlet means for supplying aqueous electrolyte medium to said anode compartment; and means adapted to withdraw an effluent stream comprising olefin oxide product produced in said cathode compartment from said cell.

10. An electrochemical cell for the production of olefin oxide from an olefinic compound, water and electrical energy which comprises in combination: a plurality of anode compartments and a plurality of cathode compartments, said anode and cathode compartments being in alternating relationship and in fluid communication by means of a foraminous cathodic surface having a fluid permeable diaphragm in association therewith; a cell base having an olefin chamber enclosed therein and comprising an upper section and a lower section spaced apart from one another with said olefin chamber therebetween, said upper section comprising a lower rigid plate having a plurality of slots therethrough, said lower section comprising a current distributing plate having a plurality of anodes set thereon, said anodes having an inner hollow chamber enclosed by the top and side walls of the anodes and at the bottom by said current distributing plate, said anodes extending upwardly from said current distributing plate through said olefin chamber and through the slots in said lower rigid plate of said upper section into said anode compartments in spaced relation to said foraminous cathodic surface, at least that portion of the side walls of said anodes which extends into said anode compartments being porous and that portion of the side walls of said anodes which extends through the olefin chamber of the base having at least one aperture therethrough to provide an open passageway between said olefin chamber and said inner hollow chamber of the anodes, said base having a manifold in association therewith enclosing an olefin chamber and having an opening through the inner wall thereof to provide a passageway between the olefin chamber therein and the olefin chamber between said upper and lower sections of the base, said manifold having inlet means adapted to feed an olefinic compound thereto; inlet means for supplying an aqueous electrolyte medium to said anode compartments; and means adapted to withdraw an effluent stream comprising olefin oxide product produced in said cathode compartments from said cell.

11. The electrochemical cell of claim 10 in which said current distributing plate is surmounted by an electrically conductive material which extends between and is in contact with the outer surface of the base of each of said anodes.

12. An electrochemical cell for the production of olefin oxide from an olefinic compound, water and electrical energy which comprises in combination: at least one anode compartment and at least one cathode compartment in fluid communication with said anode compartment by means of a foraminous cathodic surface having a fluid permeable diaphragm in association therewith; a cell base comprising a bottom rigid base plate and an upper section spaced apart from said base plate with an olefin chamber therebetween, the side enclosure of said olefin chamber being a vertically disposed wall between said base plate and said upper section, said side enclosure having an inlet therethrough adapted to feed an olefinic compound to said olefin chamber, said upper section of the base comprising a current distributing plate having at least one slot therethrough and having at least one anode set thereon, said anode having an inner hollow chamber open to said olefin chamber by means of said slot in the current distributing plate, said anode extending upwardly from said current distributing plate into said anode compartment such that the anode is spaced apart in opposing relationship to said foraminous cathodic surface, at least that portion of the side walls of the anode opposing said foraminous cathodic surface being porous; inlet means for supplying an aqueous electrolyte medium to said anode compartment; and means adapted to withdraw an effluent stream comprising olefin oxide product produced in said cathode compartment from the cell.

13. The electrochemical cell of claim 12 in which said current distributing plate is surmounted by an electrically conductive material having at least one slot therethrough within which the base of said anode is set.

14. An electrochemical cell for the production of olefin oxide from an olefinic compound, water and electrical energy which comprises in combination: an outer cell chamber and an inner cell chamber, the outer wall of said outer cell chamber being the cell casing formed of an electrically conductive material, said inner cell chamber comprising at least one anode compartment in fluid communication with said outer cell chamber by means of a foraminous cathodic surface having a fluid permeable diaphragm in association therewith; an anode assembly comprising a base having a current distributing plate horizontally disposed therein and having at least one anode set thereon, said base having a top layer of an insulating material at least around the periphery thereof upon which said cell casing is mounted, said anode having an inner hollow chamber and extending upwardly from said current distributing plate into said anode compartment in spaced opposing relationship to said foraminous cathodic surface, at least that portion of the anode opposing the foraminous cathodic surface being porous, said current distributing plate having at least one slot therethrough opposing the inner hollow chamber of said anode, and means in association with said base adapted to supply an olefinic compound to the inner hollow chamber of said anode; inlet means for supplying an aqueous electrolyte medium to said anode compartment; and means adapted to withdraw an effluent stream comprising olefin oxide product from the cell.

15. The electrochemical cell of claim 14 in which said current distributing plate is surmounted by a bonding layer in which the base of said anode is set.

16. The electrochemical cell of claim 15 in which said bonding layer is graphite.

17. The electrochemical cell of claim 15 in which said bonding layer is lead.

18. An electrochemical cell for the production of olefin oxide from an olefinic compound, water and electrical energy which comprises in combination: an outer cell chamber and an inner cell chamber, the outer wall of said outer cell chamber being the cell casing formed of electrically conductive material, said inner cell chamber comprising at least one anode compartment in fluid communication with said outer cell chamber by means of a foraminous cathodic surface having a fluid permeable diaphragm in association therewith; an anode assembly comprising a base formed of an electrically non-conductive material, said cell casing being disposed about the top surface of said electrically non-conductivve material, the interior of said base being hollow and having a recessed inner wall, a current distributing plate horizontally disposed across the hollow interior of said base and set on the recession of said inner wall of the base, said current distributing plate having at least one anode set thereon, said anode having an inner hollow chamber and extending upwardly from said current distributing plate into said anode compartment in spaced opposing relationship to said foraminous cathodic surface, at least that portion of the anode opposing the foraminous cathodic surface being porous, said current distributing plate having at least one slot therethrough opposing the inner hollow chamber of said anode, said current distributing plate being surmounted by a bonding layer in which the base of the anode is set, and means for feeding an olefinic compound to the inner hollow chamber of said anode; inlet means for supplying an aqueous electrolyte medium to said anode compartment; and means adapted to withdraw an effluent stream comprising olefin oxide product from the cell.

19. An electrochemical cell for the production of olefin oxide from water, an olefinic compound and electrical energy which comprises in combination:
  (a) a peripheral chamber and an inner cell chamber separated by a peripheral foraminous wall;
  (b) said inner cell chamber comprising a plurality of anode compartments and cathode compartments in alternating relationship, said cathodes compartments being enclosed within hollow foraminous cathodes having open side ends and extending across the inner cell chamber between and in communication with two opposing side walls of said peripheral foraminous wall having openings therethrough such that there is free-flowing fluid communication between said cathode compartments and said peripheral chamber, said foraminous cathodes and that portion of the side walls of said peripheral foraminous wall between said hollow cathodes forming a continuous foraminous surface and constituting the vertical walls of said anode compartments, said vertical walls of the anode compartments having a fluid permeable diaphragm in association therewith;
  (c) a cell base having secured therein a plurality of rigid anodes spaced apart from one another and extending upwardly from the base and into said anode compartments in spaced relationship to said foraminous surfaces having said diaphragm in association therewith, said anodes having an inner hollow chamber, and means within said base adapted to feed an olefinic compound to said inner chamber of the anodes;
  (d) a cell cover provided with inlet means adapted to feed aqueous electrolyte medium to said anode compartments between the opposing anodic and foraminous surfaces; and
  (e) outlet means in association with said peripheral chamber adapted to withdraw an effluent stream comprising olefin oxide product produced in said cathode compartments from the cell.

20. An electrochemical cell for the production of olefin oxide from an olefinic compound, water and electrical energy which comprises in combination:
(a) a cell base having a plurality of hollow porous anodes secured therein and extending upwardly therefrom, current distributing means in electrical contact with said anodes, an olefin chamber enclosed within the base and in open communication with the hollow interior of said anodes, and inlet means adapted to supply an olefinic compound to said olefin chamber;
(b) an inner cell chamber above the top surface of said base and within a peripheral foraminous cathodic wall and comprising a plurality of anode compartments, the vertical walls of which are defined by a continuous cathodic surface having a fluid permeable diaphragm in association therewith and into which the anodes secured in said base extend in spaced opposing relationship to said continuous cathodic surface, said anode compartments being in alternating relation with a plurality of cathode compartments enclosed within tubular cathodes having open side ends, said tubular cathodes being interconnected by foraminous metallic partitions which extend at least the full height thereof and which, together with the outer surfaces of said tubular cathodes, form the continuous cathodic surface of said anode compartments, said foraminous partitions comprising opposing side walls of said peripheral foraminous wall, the end walls of said peripheral foraminous wall being in substantially parallel relation to the foraminous surface of said tubular cathodes, the outer surface of said peripheral foraminous wall being opposed by a peripheral perforated wall and having a peripheral cathode compartment therebetween enclosed at the top and bottom by a continuous foraminous enclosure having a diaphragm in association therewith, said peripheral cathode compartment being in free-flowing fluid communication with the cathode compartments enclosed within said tubular cathodes through the open side ends thereof, the outer surface of said peripheral perforated wall being opposed by the inner surface of the cell casing and spaced apart therefrom with a peripheral cathode gas-liquid compartment therebetween, the apertures in said peripheral perforated wall providing open passageways between said peripheral cathode compartment and said peripheral cathode gas-liquid compartment, said cell casing being mounted on said base and electrically insulated therefrom, the outer surface of said cell casing having current distributing means in association therewith by which direct current may be supplied to said cathodic surfaces;
(c) a cell cover mounted on said cell casing and provided with inlet means adapted to supply an aqueous medium to said anode compartments such that it flows downwardly between the opposing anodic and foraminous cathodic surfaces, and outlet means adapted to withdraw anode gases evolved from the anode compartments from the cell; and
(d) outlet means in association with said peripheral cathode gas-liquid compartment adapted to withdraw cathode gases from the cell, and separate outlet means adapted to withdraw aqueous medium comprising olefin oxide product formed in the cathode compartments from the cell.

21. An electrochemical cell for the production of olefin oxide from an olefinic compound, water and electrical energy which comprises in combination: an outer cell chamber and an inner cell chamber separated by a foraminous wall, said inner cell chamber having at least one elongated hollow foraminous cathode with open side ends disposed therein enclosing a cathode compartment and having a fluid permeable diaphragm in association therewith, said hollow cathode extending across said inner cell chamber between two opposite side walls of said foraminous wall, said hollow cathode being provided at each open side end with an elongated vertically disposed channel-shaped rigid member which is slidably received by an opposing elongated vertically disposed rigid member secured to the opposing foraminous side walls, said hollow cathode being removably secured in place by tension means, said cathode compartment and said outer cell chamber being in free-flowing fluid communication by means of at least one passageway therebetween; a cell base having at least one rigid anode secured therein and extending upwardly therefrom into said inner cell chamber in spaced relation to said hollow cathode, and means adapted to supply an olefinic compound to the vicinity of the anodic surface; inlet means adapted to feed an aqueous electrolyte medium between the anodic and cathodic surfaces; and outlet means in association with said outer chamber adapted to withdraw an effluent stream comprising olefin oxide product produced in said cathode compartment from the cell.

22. An electrochemical cell for the production of olefin oxide from an olefinic compound, water and electrical energy which comprises in combination: an outer cell chamber and an inner cell chamber separated by a foraminous wall, said inner cell chamber having at least one hollow foraminous cathode with open side ends disposed therein enclosing a cathode compartment and having a fluid permeable diaphragm in association therewith, said hollow cathode extending across said inner cell chamber between two opposite side walls of said foraminous wall, each of said opposite side walls having at least one horizontally disposed locking pin extending therethrough, said hollow cathode being provided at each open side end with a vertically disposed plate having at least one opening therethrough which engages the inner end of said locking pin such that said hollow cathode is removably secured to said side walls, said cathode compartment and said outer cell chamber being in free-flowing fluid communication by means of at least one opening therebetween; a cell base having at least one rigid anode secured therein and extending upwardly therefrom into said inner cell chamber in spaced relation to said hollow cathode, and means adapted to bring an olefinic compound into the vicinity of the anodic surface; inlet means adapted to feed an aqueous electrolyte medium between the anodic and cathodic surfaces; and outlet means in association with said outer cell chamber adapted to withdraw an effluent stream comprising olefin oxide product produced in said cathode compartment from the cell.

23. An electrolytic cell which comprises in combination:
(a) a base having a plurality of rigid anodes secured therein in spaced relationship and current distributing means in electrical contact with said anodes, said anodes extending upwardly from said base and above the level thereof;
(b) a lower cathode unit mounted on said base and electrically insulated therefrom, said cathode unit comprising an outer chamber and an inner cell chamber separated by a foraminous cathodic wall, the outer wall of said outer chamber being an electrically conductive casing mounted on said base and electrically insulated therefrom, said inner cell chamber comprising a plurality of anode compartments into which the anodes secured in said base extend and to which an aqueous electrolyte medium is fed, and a plurality of cathode compartments, said cathode compartments being enclosed within hollow foraminous cathodes having open side ends and extending completely across the inner cell chamber between two opposing side walls of said foraminous wall, said cathode compartments being in fluid communication with said outer chamber, the vertical walls of the anode compartments being defined by the outer surfaces of said hollow cathodes and that portion of the foraminous cathodic wall between the open ends of each succeeding hollow cathode, said vertical walls of the anode compartments having a diaphragm in association therewith, the anodes secured in said base and which extend upwardly into said anode compartments being in spaced opposing relationship to the diaphragm on said vertical walls thereof, said casing having current distributing means in association therewith for supplying direct current to the cathodic surfaces;

(c) an upper anode assembly above said lower cathode unit and having an insulating and electrically non-conductive material interposed therebetween, said insulating material having a passageway therethrough adapted to withdraw gaseous effluent evolved from the anode compartments of said lower cathode unit therefrom, said anode assembly having a plurality of rigid anodes secured therein in spaced relationship and extending upwardly therefrom, and current distributing means therein in electrical contact with said anodes;

(d) an upper cathode unit mounted on said upper anode assembly and electrically insulated therefrom and having the same structure as said lower cathode unit, the anodes secured in said upper anode assembly extending into the anode compartments thereof;

(e) a cover mounted on said upper cathode unit comprising outlet means adapted to withdraw gaseous effluent evolved from the anode compartments of said upper cathode unit therefrom.

24. The electrolytic cell of claim 23 in which each of said anodes comprises porous side walls and an inner hollow chamber and in which said cell base and upper anode assembly are each provided with inlet means adapted to feed a fluid reactant to the hollow chamber of each of the respective anodes secured therein.

25. In an electrolytic cell in which a liquid electrolyte medium is employed and in which a vaporizable product is produced the improvement which comprises having said cell in association with an electrolyte flow interruptor through which said liquid electrolyte medium containing vaporizable product is passed which comprises in combination an outer jacket having a gas outlet at the top and a liquid outlet at the bottom; an inner concentric wall extending upwardly from the lower portion of said jacket and surrounding said liquid outlet, said inner concentric wall being provided with holes at the base thereof; an upper dome-shaped perforated baffle interposed between the upper gas outlet and the upper portion of said inner concentric wall; and a tubular passageway passing through said outer jacket and said inner concentric wall, the inner end of said passageway being angled upwardly towards said baffle and having a perforated liquid distributing means thereon adapted to allow the passage of said liquid electrolyte medium therethrough.

26. In an electrolytic cell in which a liquid electrolyte medium is employed and in which a vaporizable product is produced the improvement which comprises having said cell in association with an electrolyte flow breaker through which said liquid electrolyte medium containing vaporizable product is passed which comprises in combination an outer jacket having a gas outlet at the top and a liquid outlet at the bottom; inlet means through the side wall of said jacket, the inner end of said inlet means being angled downwardly towards said liquid outlet and being provided with liquid distributing means, said liquid distributing means comprising at least one outer truncated conically-shaped member and at least one inner truncated conically-shaped member spaced apart from said outer member, the surfaces of said conically shaped members having openings therethrough.

27. A cathodic unit for an electrolytic cell comprising in combination: an outer peripheral compartment positioned between an outer casing and a vertically disposed wall having openings therein and spaced inwardly of said outer casing, an inner peripheral compartment positioned between said vertically disposed wall and an inner foraminous wall spaced inwardly of said vertically disposed wall, said inner and outer peripheral compartments being in fluid communication with one another by means of the openings in said vertically disposed wall, at least one tubular cathode the upper and lower ends of which are closed and the side ends of which are open, said cathode being foraminous and having an interiorly disposed compartment and extending between and in communication at its open side ends with two opposite sides of said inner foraminous wall, the open side ends of said tubular cathode being spaced inwardly of and apart from said vertically disposed wall, said tubular cathode being removably secured to said inner foraminous wall by means provided at each open side end of the cathode which engages and lockably cooperates with opposing means in association with said inner foraminous wall, the compartment within said tubular cathode being in free flowing communication with said inner peripheral compartment by means of the open side ends of the cathode and an opposing opening in said inner foraminous wall with which the cathode is in communication.

28. A cathodic unit for an electrolytic cell which comprises in combination an outer peripheral chamber enclosed between an outer casing and an inner peripheral foraminous wall, a plurality of hollow foraminous cathodes having open side ends extending between and in communication with two opposite sides of said foraminous wall, each of said hollow foraminous cathodes being provided at each open side end with a rigid member comprising means which engages and lockably cooperates with opposing means in association with that portion of the inner foraminous wall with which the hollow foraminous cathodes are in communication, the hollow interior of said foraminous cathodes being in open communication with said outer chamber by means of an opening at each side end of the hollow foraminous cathodes which opposes an opening through that portion of the inner foraminous wall to which the cathodes are removably secured.

29. A cathode unit for an electrolytic cell which comprises in combination an outer casing and an inner foraminous wall with an outer chamber therebetween, and having at least one hollow foraminous cathode with open side ends extending between two opposite side walls of said foraminous wall, said hollow cathode being provided at each open side end with an elongated vertically disposed channel-shaped rigid member which is slidably received by an opposing elongated vertically disposed rigid member secured to said opposite foraminous side walls, said hollow cathode being removably secured in place by tension means, said outer chamber being in open communication with the hollow interior of said hollow cathode.

30. A cathodic unit for an electrolytic cell which comprises in combination an outer casing and an inner foraminous wall with an outer chamber therebetween, and having at least one hollow foraminous cathode with open side ends extending between two opposite side walls of said foraminous wall, each of said opposite side walls having at least one horizontally disposed locking pin extending therethrough, said hollow cathode being provided at each open side end with a vertically disposed plate having at least one opening therethrough which engages the inner end of said locking pin such that said hollow cathode is removably secured to said side walls, said outer chamber being in open communication with the hollow interior of said hollow cathode.

31. The cathodic unit of claim 30 in which said cell casing is provided with removable panels on the sides thereof which are substantially parallel to the two opposite foraminous side walls through which said locking pin extends.

32. An anode assembly for an electrochemical cell in which a fluid reactant is brought into contact with the anodic surfaces which comprises: a cell base having a chamber enclosed therein and comprising an upper section and a lower section spaced apart from one another with said chamber therebetween, said upper section comprising a lower rigid plate having slots therethrough, said lower section comprising a current distributing plate having a plurality of anodes set thereon, each of said anodes having a hollow interior enclosed by the top and side walls of the anode and at the bottom by said current distributing plate, said anodes extending upwardly from said current distributing plate through said chamber and through the slots in the lower rigid plate of said upper section, at least that portion of the side walls of said anodes which extends above the base being porous and that portion of the side walls of each of said anodes which extends through said chamber having at least one aperture therethrough to provide an open passageway between said chamber and said inner hollow chamber of the anodes.

33. The cell of claim 2 in which said outer peripheral chamber comprises an outer peripheral compartment and an inner peripheral compartment separated by a vertically disposed wall having openings therethrough and being positioned within said outer peripheral chamber and between said outer cell casing and said foraminous wall, said foraminous cathodic surface comprising a hollow cathode having said cathode compartment therein, said hollow cathode having open side ends and extending between and in communication with two opposing sides of said foraminous wall, the open side ends of said hollow cathodes being spaced inwardly of and apart from said vertically disposed wall positioned within the outer peripheral chamber, the cathode compartment within said hollow cathode being in free flowing communication with said inner peripheral compartment.

References Cited

UNITED STATES PATENTS

| | | |
|---|---|---|
| 2,273,797 | 2/1942 | Heise et al. |
| 2,390,591 | 12/1945 | Janes. |
| 2,987,463 | 6/1961 | Baker et al. ———————— 204—283 |
| 3,124,520 | 3/1964 | Juda ———————————— 204—86 |

FOREIGN PATENTS

| | | |
|---|---|---|
| 400,787 | 8/1909 | France. |
| 303,027 | 10/1929 | Great Britain. |

JOHN H. MACK, *Primary Examiner.*

D. R. JORDAN, *Assistant Examiner.*

UNITED STATES PATENT OFFICE
CERTIFICATE OF CORRECTION

Patent No. 3,342,717　　　　　　　　　　　　September 19, 1967

Joseph Adrien M. Leduc

It is hereby certified that error appears in the above numbered patent requiring correction and that the said Letters Patent should read as corrected below.

Column 1, line 11, for "electromechanical" read -- electrochemical --; column 2, line 51, for "olefins" read -- olefin --; column 6, line 63, for "and" read -- or --.

Signed and sealed this 22nd day of April 1969.

(SEAL)
Attest:

Edward M. Fletcher, Jr.　　　　　　　　　　　　EDWARD J. BRENNER
Attesting Officer　　　　　　　　　　　　　　　Commissioner of Patents